US012780708B2

(12) United States Patent
Li

(10) Patent No.: US 12,780,708 B2
(45) Date of Patent: Nov. 3, 2026

(54) SIDE PLATE CONTROLLING SYSTEMS FOR INCREASING LEAD-OUT VOLUME AMOUNT OF OVERFLOW BRICK

(71) Applicant: CAIHONG DISPLAY DEVICES CO., LTD., Xianyang (CN)

(72) Inventor: Menghu Li, Xianyang (CN)

(73) Assignee: CAIHONG DISPLAY DEVICES CO., LTD., Xianyang (CN)

( * ) Notice: Subject to any disclaimer, the term of this patent is extended or adjusted under 35 U.S.C. 154(b) by 360 days.

(21) Appl. No.: 18/399,641

(22) Filed: Dec. 28, 2023

(65) Prior Publication Data

US 2024/0208849 A1 Jun. 27, 2024

Related U.S. Application Data

(63) Continuation of application No. PCT/CN2023/084868, filed on Mar. 29, 2023.

(30) Foreign Application Priority Data

Dec. 22, 2022 (CN) ........................ 202211659336.X

(51) Int. Cl.
*C03B 17/06* (2006.01)
*G05B 19/042* (2006.01)

(52) U.S. Cl.
CPC .......... *C03B 17/064* (2013.01); *G05B 19/042* (2013.01)

(58) Field of Classification Search
CPC ............................ C03B 17/064; G05B 19/042
USPC .......................................................... 700/157
See application file for complete search history.

(56) References Cited

U.S. PATENT DOCUMENTS 6,748,765 B2 * 6/2004 Pitbladdo .............. C03B 17/064 65/195
8,646,291 B2 * 2/2014 Coppola ................. C03B 17/02 65/195
8,973,402 B2 * 3/2015 Milillo ....................... C03B 7/02 65/195
2014/0352359 A1 * 12/2014 Yu ......................... C03B 17/064 65/184
2022/0188484 A1 * 6/2022 Li ........................... C03B 17/06
2022/0267187 A1 * 8/2022 Li ......................... C03B 17/064

* cited by examiner

*Primary Examiner* — Chun Cao
(74) *Attorney, Agent, or Firm* — PORUS IP LLC

(57) ABSTRACT

The present disclosure provides a side plate controlling system for increasing a lead-out amount of an overflow brick including a data acquisition module for obtaining relevant data of a standard overflow brick system; a selection module for determining an actual overflow coefficient and an actual width of the overflow surface of an actual overflow brick system; a width shrinkage module for determining an actual critical shrinkage width; a side plate flow module for determining an average shrinkage flow rate of a side plate; an edge elongation factor module is configured to determine an edge elongation factor; a side plate thickness module for determining an average thickness of the side plate; a judgment output module for determining whether or not a magnitude relationship average thickness of the side plate and the thickness of the glass substrate satisfies a preset corresponding relationship, output the actual overflow coefficient.

20 Claims, 9 Drawing Sheets

SIDE PLATE CONTROLLING SYSTEMS FOR INCREASING LEAD-OUT VOLUME AMOUNT OF OVERFLOW BRICK

CROSS-REFERENCE TO RELATED APPLICATIONS

This application is a Continuation of International Application No. PCT/CN2023/084868, filed on Mar. 29, 2023, which claimed priority to application No. 202211659336.X, filed on Dec. 22, 2022, the entire contents of each of which are hereby incorporated by reference.

TECHNICAL FIELD

The present disclosure relates to a field of glass substrate manufacturing, and in particular, to a side plate controlling system for increasing a lead-out amount of an overflow brick.

BACKGROUND

Glass substrates used in a manufacturing of flat plate displays such as a Thin Film Transistor Display (FT-LCD) and an Organic Light Emitting Diode (OLED) are generally manufactured in an overflow pull-down process, and a glass liquid, which is melted in a glass melting furnace, is supplied to a melt overflow pull-down molding device during a molding process. A field of display manufacturing generally requires a relatively large glass substrates to increase productivity and reduce costs. However, the larger the glass substrate, the greater a difficulty in production, and the more complex a quality control of the glass substrate. An overflow brick is one of core components of a glass substrate manufacturing molding device. During a process, instability of an inlet flow and a distribution of the overflow brick is more likely to produce an overall flow instability in an overflow tank, causing irregularities in an overall flow distribution of a glass strip. For a product, any fluctuation in a production line may cause pulling fluctuations, resulting in instability production and a yield rate decrease. For glass substrate manufacturers, increasing the lead-out amount is one of the easiest ways to production output and production line efficiency.

However, in addition to considering a design of a width of an inlet tank of the overflow brick, the influence of a plurality of complex factors on a distribution of a thickness of the glass substrate also needs to be considered, i.e., increasing a production margin in design. One of the core technologies of the overflow brick design is to ensure that a product performance of the glass substrate meets requirements of customers while increasing the lead-out amount.

Therefore, it is necessary to propose a side plate controlling system for increasing a lead-out amount of an overflow brick, to satisfy the requirements by adjust a side plate thickness in a glass substrate molding process, which can solve a problem of lead-out plate fluctuation caused by a thin thickness of the side plate during the glass substrate molding process after the lead-out amount is increased.

SUMMARY

One or more embodiments of the present disclosure provide a side plate controlling system for increasing a lead-out amount of an overflow brick. The system may include a data acquisition module, a communication module, a selection module, a width shrinkage module, a side plate flow module, an edge elongation factor module, a side plate thickness module, and a judgment output module.

The data acquisition module may be configured to obtain an overflow coefficient, a product specification, a width of an overflow surface, and a critical shrinkage width of a standard overflow brick system.

The selection module may be configured to determine an actual overflow coefficient and an actual width of the overflow surface of an actual overflow brick system based on the overflow coefficient and the product specification.

The width shrinkage module may be configured to determine an actual critical shrinkage width based on the width of the overflow surface, the critical shrinkage width, and the actual width of the overflow surface.

The side plate flow module may be configured to determine an average shrinkage flow rate of a side plate based on a lead-out amount of the actual overflow brick system, a width of an effective surface of a glass substrate, and the actual width of the overflow surface.

The edge elongation factor module may be configured to determine an edge elongation factor of the glass substrate based on the actual width of the overflow surface, the width of the effective surface, and a thickness of the glass substrate.

The side plate thickness module may be configured to determine an average thickness of the side plate based on the thickness of the glass substrate, the average shrinkage flow rate of the side plate, the lead-out amount, a width of a lead-out plate, and the width of the effective surface.

The judgment output module may be configured to, in response to determining that a magnitude relationship between the average thickness of the side plate and the thickness of the glass substrate satisfies a preset corresponding relationship, output the actual overflow coefficient and the actual width of the overflow surface corresponding to the actual overflow coefficient. The judgment output module may also be configured to, in response to determining that the magnitude relationship between the average thickness of the side plate and the thickness of the glass substrate does not satisfy the preset corresponding relationship, adjust the actual overflow coefficient until the magnitude relationship between the average thickness of the side plate and the thickness of the glass substrate satisfies the preset corresponding relationship, output the adjusted actual overflow coefficient and an adjusted actual width of the overflow surface corresponding to the adjusted actual overflow coefficient, wherein the adjusting process includes performing one or more iterations.

The communication module may be configured to communicate with the data acquisition module, the selection module, the width shrinkage module, the side plate flow module, the edge elongation factor module, the side plate thickness module, the judgment output module, and an overflow brick production system. The communication module may also be configured to, in response to obtaining an output result of the judgment output module, send the output result to the overflow brick production system for production control, wherein the output result includes the actual overflow coefficient and the actual width of the overflow surface or the output result includes the adjusted actual overflow coefficient and the adjusted actual width of the overflow surface.

BRIEF DESCRIPTION OF THE DRAWINGS

The present disclosure may be further illustrated by way of exemplary embodiments, which may be described in detail by means of the accompanying drawings. These embodiments are not limiting, and in these embodiments the same numbering indicates the same structure, wherein.

Figure 1:
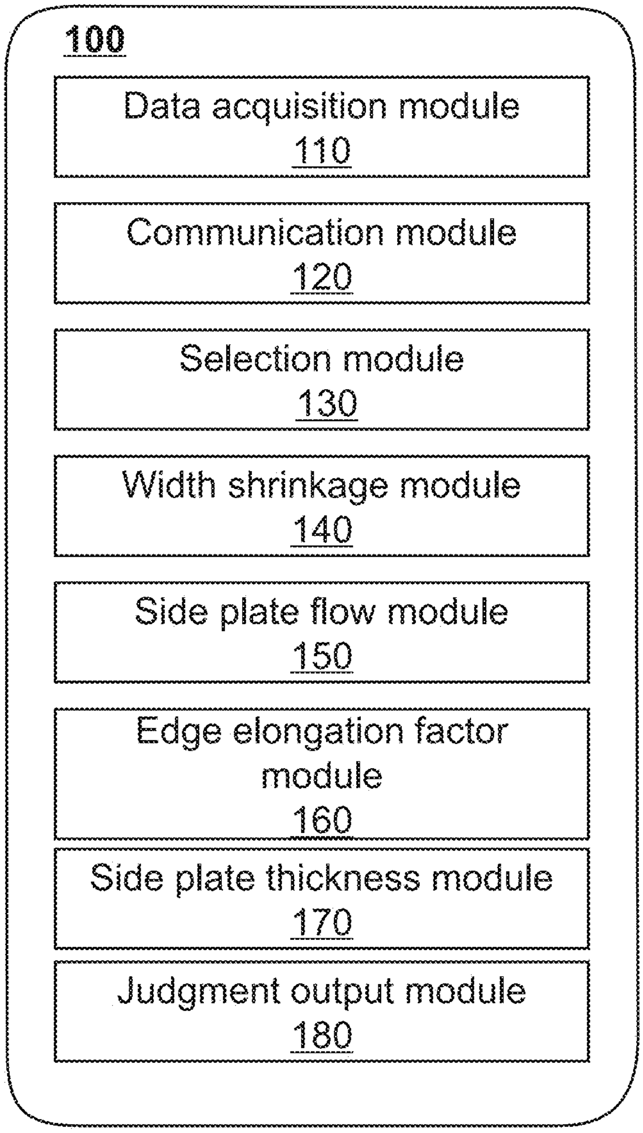
FIG. 1 is a schematic diagram illustrating exemplary modules of a side plate controlling system for increasing a lead-out amount of an overflow brick according to some embodiments of the present disclosure.

Reference signs: 1—overflow brick; 2—overflow tank; 3—glass liquid feeding device; 4—overflow brick root; 5—molded glass substrate; 6—pull-down direction of a glass substrate; 7—side plate range.

DETAILED DESCRIPTION

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit" and/or "module" as used herein is a manner used to distinguish different components, elements, parts, sections, or assemblies at different levels. However, if other words serve the same purpose, the words may be replaced by other expressions.

As shown in the present disclosure and claims, the words "one", "a", "a kind" and/or "the" are not especially singular but may include the plural unless the context expressly suggests otherwise. In general, the terms "comprise," "comprises," "comprising," "include," "includes," and/or "including," merely prompt to include operations and elements that have been clearly identified, and these operations and elements do not constitute an exclusive listing. The methods or devices may also include other operations or elements.

The flowcharts used in the present disclosure illustrate operations that systems implement according to some embodiments of the present disclosure. It should be understood that the previous or subsequent operations may not be accurately implemented in order. Instead, each step may be processed in reverse order or simultaneously. Meanwhile, other operations may also be added to these processes, or a certain step or several steps may be removed from these processes.

FIG. 1 is a schematic diagram illustrating exemplary modules of a side plate controlling system for increasing a lead-out amount of an overflow brick according to some embodiments of the present disclosure.

As shown in FIG. 1, in some embodiments, the side plate controlling system for increasing the lead-out amount of the overflow brick 100 (hereinafter referred to as the system 100) may include a data acquisition module 110, a communication module 120, a selection module 130, a width shrinkage module 140, a side plate flow module 150, an edge elongation factor module 160, a side plate thickness module 170, and a judgment output module 180.

In some embodiments, the data acquisition module may be configured to obtain an overflow coefficient, a product specification, a width of an overflow surface, and a critical shrinkage width of a standard overflow brick system.

The standard overflow brick system refers to a standard system for adjusting glass overflow during a glass substrate manufacturing process. The overflow brick is one of core components of a glass substrate manufacturing molding device.

The overflow coefficient refers to a coefficient related to a glass overflow amount. The overflow coefficient may be expressed as $\gamma$. In some embodiments, the overflow coefficient may be a ratio of a width of a lead-out plate to a width of an overflow surface of the overflow brick.

The lead-out plate is a basis for molding the glass substrate. In a pull-down molding, the glass substrate may be gradually formed by a molten glass liquid along the lead-out plate. The width of the lead-out plate refers to a value of the width of the lead-out plate in a direction perpendicular to a flow direction of the glass liquid. The width of the lead-out plate may be expressed as $W_Y$.

The product specification refers to a specification parameter or information of a target glass substrate to be manufactured, such as a size, a thickness of the target glass substrate, or the like.

The width of the overflow surface is a width of an opening at a top of the overflow brick. In some embodiments, the larger the width of the overflow surface, the larger the glass overflow amount.

The critical shrinkage width refers to a critical width of the glass liquid shrinkage during a cooling process, i.e., a minimum width of the glass liquid during a cooling process.

In some embodiments, the data acquisition module 110 may be configured to obtain the overflow coefficient, the product specification, the width of the overflow surface, and the critical shrinkage width of the standard overflow brick system via a database of the system 100. The database may store information and/or data related to the system 100. Users of the system (e.g., administrators, users, designers, etc.) may input or modify the parameters of the system via a user terminal and/or a third-party platform, or the like.

In some embodiments, the data acquisition module 110 may further include a sensor. The sensor may be configured to obtain sensing data, and the sensor may include an image sensor, or the like, more descriptions may be found in FIG. 3 and related descriptions.

In some embodiments, the selection module 130 may be configured to determine an actual overflow coefficient and an actual width of the overflow surface of an actual overflow brick system based on the overflow coefficient and the product specification.

The actual overflow brick system refers to a system configured to adjust the glass overflow during an actual manufacturing process of the glass substrate.

The actual overflow coefficient refers to an overflow coefficient during the actual manufacturing process of the glass substrate.

The actual width of the overflow surface refers to a width of the glass substrate during the actual manufacturing process. In some embodiments, the actual width of the overflow surface may be expressed as W.

In some embodiments, the selection module 130 may be configured to determine the actual overflow coefficient and the actual width of the overflow surface of the actual overflow brick system based on the overflow coefficient and the product specification in a plurality of ways. For example, the selection module 130 may be configured to obtain the actual overflow coefficient and the actual width of the overflow surface through a preset algorithm based on the overflow coefficient and the product specification. The preset algorithm refers to a preset algorithm for calculating the actual overflow coefficient and the actual width of the overflow surface based on the overflow coefficient and the product specification. The preset algorithm may be set manually according to requirements.

In some embodiments, the selection module 130 may be further configured to determine the actual overflow coefficient of the actual overflow brick system based on the overflow coefficient; determine an average width of a side plate, a width of an effective surface of the glass substrate, and a thickness of the glass substrate based on the product specification; determine a width of a lead-out plate based on the average width of the side plate and the width of the effective surface; determine the actual width of the overflow surface based on the width of the lead-out plate and the average width of the side plate.

In some embodiments, the selection module 130 may be further configured to determine the actual overflow coefficient of the actual overflow brick system based on the overflow coefficient of the standard overflow brick system. For example, the selection module 130 may designate the overflow coefficient of the standard overflow brick system directly as the actual overflow coefficient of the actual overflow brick system.

The average width of the side plate refers to an average value of a width of the side plate. To ensure the lead-out effect of the lead-out plate, the lead-out plate may be designed to make the width gradually reduced from the top to bottom. The side plate refers to a remaining portion of the lead-out plate removing an effective width portion of the glass substrate. In some embodiments, the average width of the side plate may be expressed as $W_E$.

The width of the effective surface refers to a using width of a target glass substrate. The width of the effective surface may be expressed as $W_G$.

The thickness of the glass substrate refers to a design value of the thickness of the target glass substrate. The thickness of the glass substrate may be expressed as T. The control for the thickness and consistency of the glass substrate are significant design and process technologies. According to actual requirements, the overflow brick may be compatible with a manufacturing of a glass substrate with a thickness of 0.2 to 0.7 mm generally, so that the design of the overflow brick needs to also be compatible with the manufacturing of the glass substrate with the thickness of 0.2 to 0.7 mm.

In some embodiments, the selection module 130 may be further configured to select a width and a thickness of the target glass substrate in the product specification as the width of the effective surface and the thickness of the glass substrate, respectively. The selection module 130 may be further configured to select an average width of the side plate from design parameters of the product specification.

In some embodiments, the selection module 130 may be further configured to determine a width of the lead-out plate in a plurality of ways based on the average width of the side plate and the width of the effective surface. In some embodiments, the width of the lead-out plate may be positively correlated to the average width of the side plate and the width of the effective surface. For example, the selection module 130 may be further configured to determine the width of the lead-out plate by calculation, such as by equation (6-1), as may be seen in FIG. 6 and the related descriptions.

In some embodiments, the selection module 130 may be further configured to determine an actual width of the overflow surface based on the width of the lead-out plate and the average width of the side plate in a plurality of ways. For example, the selection module 130 may be further configured to determine the actual width of the overflow surface based on the width of the lead-out plate and the average width of the side plate by a preset calculation manner. In some embodiments, the actual width of the overflow surface may be positively correlated to the width of the lead-out plate and negatively correlated to the overflow coefficient. For example, the selection module 130 may be further configured to determine the actual width of the overflow surface by calculation, such as by equation (6-2), as may be seen in FIG. 6 and the related descriptions. In some embodiments, the selection module may be further configured to also determine the actual width of the overflow surface in other feasible ways.

In some embodiments of the present disclosure, based on the overflow coefficient of the standard overflow brick system, the product specification, the actual overflow coefficient and the average width of the side plate may be determined, and the width of the lead-out plate and the actual width of the overflow surface may be further determined, so that the actual width of the overflow surface can be obtained more accurately in the actual production process, making the subsequent calculation of other parameters more accurate.

In some embodiments, the width shrinkage module 140 may be configured to determine an actual critical shrinkage width based on the width of the overflow surface, the critical shrinkage width, and the actual width of the overflow surface.

The actual critical shrinkage width refers to a critical shrinkage width in the actual production process. The actual critical shrinkage width may be expressed as $W_J$ In some embodiments, the width shrinkage module 140 may determine the actual critical shrinkage width in a plurality of ways based on the width of the overflow surface, the critical shrinkage width, and the actual width of the overflow surface. In some embodiments, the actual critical shrinkage width may be positively correlated to the actual width of the overflow surface and the critical shrinkage width, and negatively correlated to the width of the overflow surface. In some embodiments, the width shrinkage module 140 may obtain the actual critical shrinkage width by calculating, e.g., by equation (6-3), as more may be found in FIG. 6 and the related descriptions.

In some embodiments, the side plate flow module 150 may be configured to determine an average shrinkage flow rate of the side plate based on the actual overflow brick system, the width of the effective surface, and the actual width of the overflow surface.

The lead-out amount refers to a flow rate of the glass liquid at an inlet of the overflow brick. The lead-out amount of the actual overflow brick system may be expressed as Q. To increase the output and line efficiency, the lead-out amount may be increased. In addition to considering the design of the inlet width of the overflow brick, the increasing of the lead-out amount also considers a flow balance control of the side plate of the far and near end of the overflow brick, and an overall thickness uniformity distribution, or the like. After the lead-out amount is increased, the side plate may be controlled to ensure a flow stability at the side plate of the glass liquid. Different lead-out amounts correspond to different control processes of the side plate at each point.

The average shrinkage flow rate of the side plate refers to an average flow rate of a shrinkage glass liquid at the side plate. The average shrinkage flow rate of the side plate may be expressed as $Q_E$.

In some embodiments, the side plate flow module 150 may be configured to determine the average shrinkage flow rate of the side plate based on the actual lead-out amount of the overflow brick system, the width of the effective surface, and the actual width of the overflow surface by looking up a first preset table. The first preset table stores the lead-out amount, the width of the effective surface, the actual width of the overflow surface, and the corresponding average shrinkage flow rate of the side plate in a historical production process.

In some embodiments, the side plate flow module 150 may be further configured to determine an average unshrinking flow rate of the side plate based on the lead-out amount, the width of the effective surface, and the actual width of the overflow surface; and determine an average shrinkage flow rate of the side plate based on the average unshrinking flow rate of the side plate.

The average unshrinking flow rate of the side plate refers to an average flow rate of the glass liquid at the side plate before shrinkage. The average unshrinking flow rate of the side plate may be expressed as $Q_{E0}$.

In some embodiments, the side plate flow module 150 may be configured to determine the average unshrinking flow rate of the side plate in a plurality of ways based on the lead-out amount, the width of the effective surface, and the actual width of the overflow surface. In some embodiments, the average unshrinking flow rate of the side plate may be positively correlated to the lead-out amount and the actual width of the overflow surface, and negatively correlated to the width of the effective surface. For example, the side plate flow module 150 may be configured to obtain the average unshrinking flow rate of the side plate by calculating the equation, e.g., equation (6-8). More descriptions of the equation (6-8) may be found in FIG. 6 and related descriptions. In some embodiments, the side plate flow module 150 may also calculate the average unshrinking flow rate of the side plate from other existing equations or custom equations, or the like.

In some embodiments, the side plate flow module 150 may be configured to obtain the average shrinkage flow rate of the side plate based on the average unshrinking flow rate of the side plate in a plurality of manners. For example, the side plate flow module 150 may be configured to obtain the average shrinkage flow rate of the side plate by calculating the equation, e.g., by equation (6-9). More descriptions of the equation (6-9) may be found in FIG. 6 and related descriptions. In some embodiments, the side plate flow module 150 may also be configured to calculate the average shrinkage flow rate of the side plate based on the average unshrinking flow rate of the side plate, or by other existing equations or customized equations.

In some embodiments of the present disclosure, the average unshrinking flow rate of the side plate may be determined, and the average shrinkage flow rate of the side plate may be determined by the lead-out amount, the width of the effective surface, and the actual width of the overflow surface. The average shrinkage flow rate of the side plate may be adjusted according to the average unshrinking flow rate of the side plate flow rate so that the obtained average shrinkage flow rate of the side plate can be more accurate.

In some embodiments, the edge elongation factor module may be configured to determine an edge elongation factor of the glass substrate based on the actual width of the overflow surface, the width of the effective surface, and the thickness of the glass substrate.

The edge elongation factor refers to a parameter that reflects a stretching or extruding of the glass substrate. The edge elongation factor may be expressed as β.

In some embodiments, the side plate thickness module 170 may be configured to determine the edge elongation factor of the glass substrate in a plurality of ways based on the actual width of the overflow surface, the width of the effective surface, and the thickness of the glass substrate. In some embodiments, the edge elongation factor may be positively correlated to the width of the effective surface and the thickness of the glass substrate, and negatively correlated to the actual width of the overflow surface. For example, the side plate thickness module 170 may be configured to obtain the edge elongation factor by calculation the equation, such as equation (6-4). More descriptions of the equation (6-4) may be found in FIG. 6 and related descriptions.

In some embodiments, the side plate thickness module 170 may be configured to determine the average thickness of the side plate based on the thickness of the glass substrate, the average shrinkage flow rate of the side plate, the lead-out amount, the width of the lead-out plate, and the width of the effective surface.

The average thickness of the side plate refers to an average value of thicknesses of side plates. The average thickness of the side plate may be expressed as $T_E$.

In some embodiments, the side plate thickness module 170 may be configured to determine the average thickness of the side plate in a plurality of ways based on the thickness of the glass substrate, the average shrinkage flow rate of the side plate, the lead-out amount, the width of the lead-out plate, and the width of the effective surface. In some embodiments, the average thickness of the side plate may be positively correlated to the thickness of the glass substrate, the average shrinkage flow rate of the side plate, and the width of the effective surface, and negatively correlated to the lead-out amount and the width of the lead-out plate. In some embodiments, the average thickness of the side plate may also be negatively correlated to the edge elongation factor. In some embodiments, the side plate thickness module 170 may be configured to obtain the average thickness of the side plate by calculation the equation, such as equation (6-5). More descriptions of the equation (6-5) may be found in FIG. 6 and related descriptions.

In some embodiments, the judgment output module may be configured to output, in response to determining that a magnitude relationship between the average thickness of the side plate and the thickness of the glass substrate satisfies a preset corresponding relationship, the actual overflow coefficient at present and the actual width of the overflow surface corresponding to the actual overflow coefficient; in response to determining that the magnitude relationship between the average thickness of the side plate and the thickness of the glass substrate does not satisfy the preset corresponding relationship, adjust the actual overflow coefficient until the magnitude relationship between the average thickness of the side plate and the thickness of the glass substrate satisfies the preset corresponding relationship, output an adjusted actual overflow coefficient and an adjusted actual width of the overflow surface corresponding to an adjusted actual overflow coefficient.

The preset corresponding relationship refers to a relationship preset between the average thickness of the side plate and the thickness of the glass substrate. The preset corresponding relationship may be set manually based on experience.

In some embodiments, the magnitude relationship between the average thickness of the side plate and the thickness of the glass substrate may be expressed by a ratio coefficient between the average thickness of the side plate and the thickness of the glass substrate, which may be expressed as K.

In some embodiments, the ratio coefficient may be greater than or equal to 2.5 and less than or equal to 3.5.

In some embodiments, the preset corresponding relationship may be that a ratio between the average thickness of the side plate and the thickness of the glass substrate is greater than or equal to the ratio coefficient. In response to determining that the ratio between the average thickness of the side plate and the thickness of the glass substrate is greater than or equal to the ratio coefficient, the judgment output module may output the actual overflow coefficient at present and the actual width of the overflow surface corresponding to the actual overflow coefficient. Further, in response to determining that the ratio between the average thickness of the side plate and the thickness of the glass substrate is less than the ratio coefficient, the judgment output module may adjust the actual overflow coefficient until the ratio between the average thickness of the side plate and the thickness of the glass substrate is greater than or equal to the ratio coefficient and output the adjusted actual overflow coefficient and the adjusted actual width of the overflow surface corresponding to the adjusted actual overflow coefficient.

In some embodiments, when the magnitude relationship between the average thickness of the side plate and the thickness of the glass substrate does not satisfy the preset corresponding relationship, indicating that the average thickness of the side plate is relatively large or relatively small, and the judgment output module 180 may correspondingly adjust the actual overflow coefficient smaller or larger. The adjusted actual overflow coefficient corresponding to the adjusted actual width of the overflow surface refers to an actual width of the overflow surface calculated based on the adjusted actual overflow coefficient according to the aforementioned manner. In some embodiments, the adjustment may include one or more iterations. For example, the judgment output module 180 may determine an iterative step size of the actual overflow coefficient based on an incremental learning process; update the actual overflow coefficient based on the iterative step size; update the actual width of the overflow surface based on the updated coefficient; determine an updated side plate thickness based on the updated coefficient and an updated width; in response to determining that the magnitude relationship between the updated side plate thickness and the thickness of the glass substrate satisfies the preset corresponding relationship, stop the iteration and output the updated coefficient and the updated width corresponding to the updated coefficient. More descriptions of the iterations may be found in FIG. 2 and related descriptions.

In some embodiments, the judgment output module may be further configured to continue to adjust the actual overflow coefficient such that the ratio coefficient between the average thickness of the side plate and the thickness of the glass substrate is greater than or equal to 3 and less than or equal to 5. The adjustment manner is similar to the manner described above, which may be found in related descriptions above.

In some embodiments of the present disclosure, the actual overflow coefficient may be adjusted according to the actual requirements and broaden the range of the ratio coefficient, to keep the average thickness of the side plate in a reasonable range, and the larger the average thickness of the side plate, the more stable the side plate control, which makes the lead-out plate more stable.

In some embodiments, the communication module may be configured to communicate with the data acquisition module, the selection module, the width shrinkage module, the side plate flow module, the edge elongation factor module, the side plate thickness module, the judgment output module, and the overflow brick production system; send, in response to obtaining an output result of the judgment output module, the output result to the overflow brick production system for production control.

The overflow brick production system refers to a system for producing the glass substrate and the overflow brick. The actual overflow brick system may include the overflow brick production system.

In some embodiments, the output result may be data output by the judgment output module. In some embodiments, the output result may include the actual overflow coefficient and the actual width of the overflow surface, or the output result may include the adjusted actual overflow coefficient and the adjusted actual width of the overflow surface. When the magnitude relationship between the average thickness of the side plate and the thickness of the glass substrate satisfies the preset corresponding relationship, the judgment output module may output the actual overflow coefficient at present and the actual width of the overflow surface corresponding to the actual overflow coefficient. When the magnitude relationship between the average thickness of the side plate and the thickness of the glass substrate does not satisfy the preset corresponding relationship, the judgment output module may adjust the actual overflow coefficient until the magnitude relationship between the average thickness of the side plate and the thickness of the glass substrate satisfies the preset corresponding relationship, and output the adjusted actual overflow coefficient and the adjusted actual width of the overflow surface corresponding to the adjusted actual overflow coefficient. More detailed descriptions may be found in the related descriptions in FIG. 1.

In some embodiments, the system 100 may further include a lead-out plate speed module and a side plate quality module.

In some embodiments, the lead-out plate speed module may be configured to determine a cut width and a cut height of the glass substrate based on the width of the effective surface; determine the cut height of the glass substrate based on a density of the glass substrate, the average shrinkage flow of the side plate, the average thickness of the side plate, the width of the lead-out plate, the width of the effective surface, the width of the effective surface, and the edge elongation factor to determine a speed of the lead-out plate.

The cut width and the cut height respectively refer to a width and a height corresponding to the product specification of the glass substrate.

In some embodiments, the lead-out plate speed module may be configured to determine the cut width and the cut height of the glass substrate in a plurality of ways based on the width of the effective surface. In some embodiments, the lead-out plate speed module may be configured to obtain the cut width and cut height of the glass substrate by querying a second preset table. The second preset table may include a plurality of widths of the effective surface corresponding to different cut widths and cut heights.

The density of the glass substrate refers to a density that corresponds to the product specification of the glass substrate. The density of the glass substrate may be determined by querying the database. More descriptions of the database may be found in FIG. 1 and related descriptions.

The speed of the lead-out plate refers to a speed at which the lead-out plate moves downward during the production process of the glass substrate.

In some embodiments, the lead-out plate speed module may determine the speed of the lead-out plate in a plurality of ways based on the density of the glass substrate, the average shrinkage flow rate of the side plate, the average thickness of the side plate, the width of the lead-out plate, the width of the effective surface, and the edge elongation factor. In some embodiments, the speed of the lead-out plate may be positively correlated to the contraction average side plate flow rate, and negatively correlated to the density of the glass substrate, the average thickness of the side plate, a difference between the width of the lead-out plate and the width of the effective surface, and the edge elongation factor. In some embodiments, the lead-out plate speed module may be configured to obtain the speed of the lead-out plate by calculating the equation, e.g., by calculating an equation (6-11), more descriptions may be found in FIG. 6 and the related descriptions.

The average quality of the side plate refers to an average value of the qualities of side plates during the production process of the glass substrate.

In some embodiments, the side plate quality module may be configured to determine, based on the lead-out amount, the speed of the lead-out plate, the cut width, the cut height, the thickness of the glass substrate, the width of the effective surface, the density of the glass substrate, the average thickness of the side plate, and the edge elongation factor, the average quality of the side plate in a plurality of ways. In some embodiments, the average quality of the side plate may be positively correlated to the lead-out amount. The average quality of the side plate may be negatively correlated to the thickness of the glass substrate, the cut height, the density of the glass substrate, the edge elongation factor, or the like. In some embodiments, the side plate quality module may be configured to obtain the average quality of the side plate by calculating, such as an equation (6-6) to, more descriptions may be found in FIG. 6 and the related descriptions.

In some embodiments of the present disclosure, stable process requirements for glass substrate line manufacturing may be met by further determining the speed of the lead-out plate and the average quality of the side plate.

In some embodiments, the system 100 may further include a utilization module.

In some embodiments, the utilization module may be configured to determine an effective utilization rate based on the lead-out amount and the average shrinkage flow rate of the side plate.

The effective utilization rate refers to an effective utilization rate of the glass liquid used to produce the glass substrate.

In some embodiments, the utilization module may be configured to determine the effective utilization rate based on the lead-out amount and the average unshrinking flow rate of the side plate in a plurality of ways. In some embodiments, the effective utilization rate is negatively correlated to the average unshrinking flow rate of the side plate when the lead-out amount is certain. In some embodiments, the utilization module may be configured to obtain the effective utilization rate by calculating the equation, e.g., by an equation (6-7), more descriptions may be found in FIG. 6 and the related descriptions.

The effective utilization rate refers to an important indicator used to measure the production quality of the glass substrate, the higher the effective utilization rate, the lower the waste in the production process of the glass substrate. By further determining the effective utilization rate, the stable process requirements for glass substrate line manufacturing may be further met. When the effective utilization rate is low, indicating that there may be a problem in the production process, and technicians may troubleshoot the problem on time to avoid greater losses.

In some embodiments of the present disclosure, using the side plate controlling system for increasing the lead-out amount of the overflow brick may effectively solve the problem of lead-out plate fluctuation in the glass substrate molding process after the lead-out amount is increased, thereby optimizing an uneven distribution of the molding thickness in glass substrate manufacturing.

In some embodiments, the system 100 may further include a control module (not shown in the figures) and a calculation module (not shown in the figures). The control module may be configured to obtain sensing data collected by the sensor and transmit the sensing data to the calculation module via the communication module. The calculation module may determine real-time quality data of the glass substrate based on the sensing data and determine an adjustment amount and a corrective overflow coefficient based on the real-time quality data. More descriptions may be found in FIG. 3 and related descriptions.

In some embodiments, the communication module may be further configured to communicate with the control module and the calculation module.

It should be understood that the system and its modules shown in FIG. 1 may be implemented in a plurality of ways.

It should be noted that the above description of the side plate controlling system for increasing the lead-out amount of the overflow brick and its modules is only for descriptive convenience and does not limit the present disclosure to the scope of the cited embodiments. For those skilled in the art, after understanding the principle of the system, may arbitrarily combine the individual modules or form a sub-system to be connected to the other modules without departing from the principle. In some embodiments, the data acquisition module, the communication module, the selection module, the width shrinkage module, the side plate flow module, the edge elongation factor module, the side plate thickness module, and the judgment output module disclosed in FIG. 1 may be different modules in the system or may be a module realizing functions of two or more modules described above. For example, the modules may share a common storage module, and each of the modules may have a respective storage module. Such deformations are within the protection scope of the present disclosure.

Figure 2:
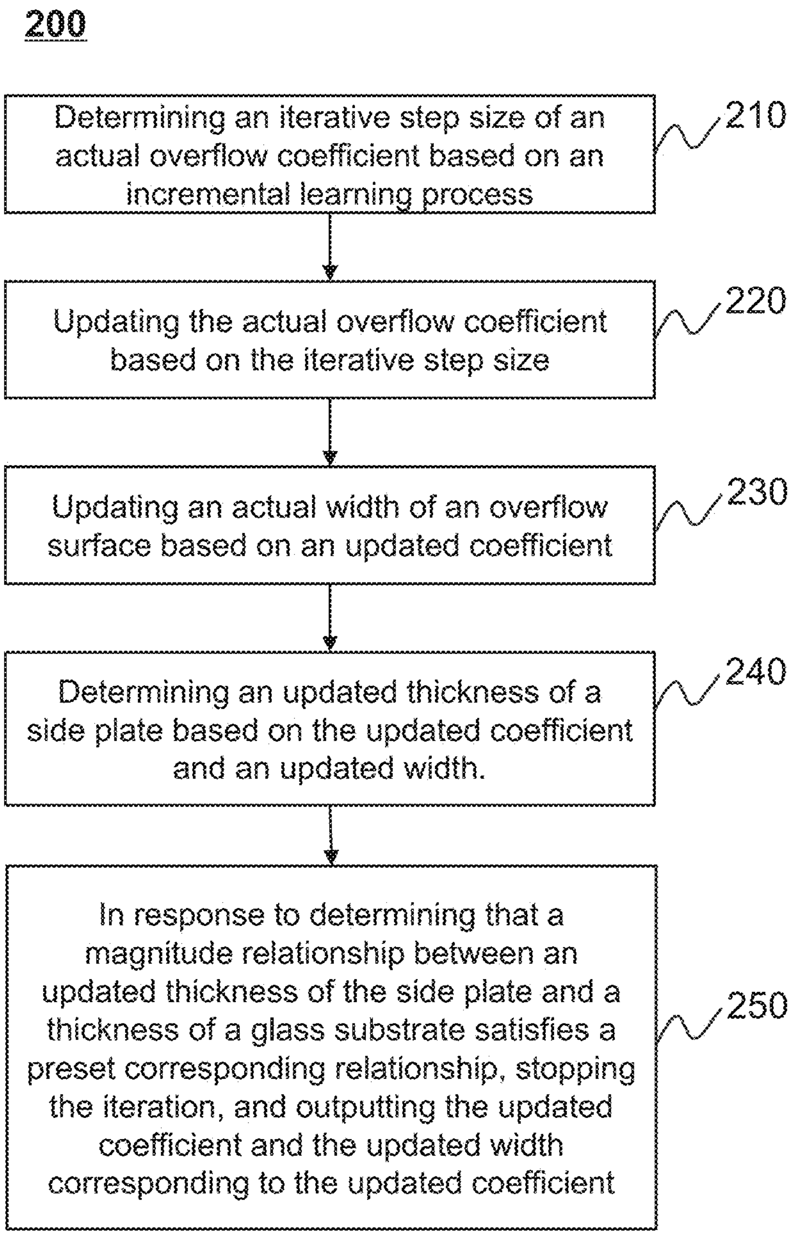
FIG. 2 is a flowchart illustrating an exemplary process for performing one or more iterations according to some embodiments of the present disclosure.

FIG. 2 is a flowchart illustrating an exemplary process for performing one or more iterations according to some embodiments of the present disclosure. As shown in FIG. 2, process 200 may include the following operations. In some embodiments, the process 200 may be performed by a judgment output module 180 in the system 100.

In some embodiments, in response to determining that the magnitude relationship between an average thickness of the side plate and a thickness of a glass substrate does not satisfy a preset corresponding relationship, the judgment output module 180 may be configured to adjust the actual overflow coefficient through one or more iterations. The following is illustrated by way of an example with one iteration (e.g., a n-th iteration) of one or more iterations, wherein n is a natural number being greater than or equal to 1.

In 210, an iterative step size of the actual overflow coefficient may be determined based on an incremental learning process.

The incremental learning process refers to a process for determining an iterative step size for each iteration in an iterative process. In some embodiments, the incremental learning process may include a plurality of processes, for example, the incremental learning process may be a trained incremental learning model, a step size determination algorithm, or the like. The trained incremental learning model may be a machine learning model.

In the first iteration, the iterative step size of the actual overflow coefficient may be preset according to actual requirements.

In some embodiments, when n is greater than or equal to 2, an input of the incremental learning model in the n-th iteration may include one or more of an average thickness of the side plate, a thickness of the glass substrate, an actual overflow coefficient, a ratio coefficient, and an iterative step size corresponding to the first iteration to the n−1 iteration. An output of the incremental learning model in the n-th iteration may include an iterative step size of the n-th round.

More descriptions of the average thickness of the side plate, the thickness of the glass substrate, the actual overflow coefficient, and the ratio coefficient may be found in FIG. 1 and the related descriptions.

The iterative step size refers to a value of the actual overflow coefficient needs to be increased during the iteration. For example, an iterative step size for the n-th iteration is $\Delta\gamma_n$. In some embodiments, the iterative step size $\Delta\gamma_n$ may be determined based on a distance of a ratio coefficient $K_2$ and a ratio coefficient range (e.g., 2.5-3.5). For example, when the distance between $K_2$ and the ratio coefficient range is large, the iterative step size $\Delta\gamma_n$ may be set to be relatively large to speed up the iteration efficiency. When $K_2$ is close to the ratio coefficient range, the iterative step size $\Delta\gamma_n$ may be set smaller to increase the accuracy of the iteration results. The iterative step size $\Delta\gamma_n$ may not be larger than a preset iterative step size $\Delta\gamma_1$. More descriptions of the ratio coefficient $K_n$ may be found in the related descriptions.

In some embodiments, the incremental learning model may be a model obtained by training based on an initial incremental learning model (e.g., at least one of a Light Gradient Boosting Machine model (LightGBM), an eXtreme Gradient Boosting (XGBoost), etc.) as a basis for training the obtained model.

In some embodiments, the incremental learning model may be obtained by training the initial incremental learning model with a training set and updating model parameters of the initial incremental learning model. The training set may include first training samples and first training labels corresponding to the first training samples. Each set of the first training samples may include one or more of a sample average thickness of the side plate, a sample thickness of the glass substrate, a sample actual overflow coefficient, a sample ratio coefficient, a sample history iterative step size, or the like. The first training labels refer to the sample iterative step size. The first training samples may be obtained from historical data. The first training labels corresponding to the first training samples may be a sample iterative step size corresponding to each set of training samples. The first training labels may be obtained by manual labeling or automatic labeling.

In some embodiments, the judgment output module may be configured to input a plurality of first training samples with the first training labels into the initial incremental learning model, construct a loss function through the first training labels and results of the initial incremental learning model, and update the parameters of the initial incremental learning model based on the loss function via gradient descent or other manner to iteratively update the parameters of the initial incremental learning model. The model training may be completed when satisfying an iteration condition, and a trained incremental learning model may be obtained. The iteration condition may include the loss function converges, a count of iterations reaching a threshold, or the like. In some embodiments, the trained incremental learning model may be tested by a test set, and the trained incremental learning model that passes a test may be designated as the incremental learning model. The test set refers to data used to validate the trained incremental learning model. A standard for passing the test may be set according to actual requirements. The trained incremental learning model may be tested by the test set, and when the test fails, the training may be performed again, and the parameters of the model may be updated until the test passes to obtain the incremental learning model.

In some embodiments, the judgment output module 180 may be configured to determine an iterative step size by the step size determination algorithm based on the average thickness of the side plate, the ratio coefficient, the thickness of the glass substrate, and the preset iterative step size. More descriptions of the average thickness of the side plate, the ratio coefficient, and the thickness of the glass substrate may be found in FIG. 1 and related descriptions.

The preset iterative step size refers to a preset iterative step size for the first iteration. The preset iterative step size may be set manually.

The step size determination algorithm refers to an algorithm for determining an optimal step size. For example, the step size determination algorithm may include a trial method, a function search method, or the like.

In some embodiments, the actual overflow coefficient for the first iteration is expressed by $\gamma_1$, and the preset iterative step size is $\Delta\gamma_1$. The iterative step size of the second iteration is $\Delta\gamma_2$. The preset iterative step size $\Delta\gamma_1$ and iterative step size $\Delta\gamma_2$ may be preset according to the actual requirements.

In some embodiments, when n is greater than or equal to 3, assuming that the iterative step size of the n-th iteration is $\Delta\gamma_n$, and the ratio coefficient is $K_n$.

If $K_{n-1}$ is not within a ratio coefficient range (e.g., 2.5-3.5) and $K_{n-1}<K_{n-2}$, $\Delta\gamma_n=\Delta\gamma_{n-1}$ may add a preset value to perform the current n-th iteration.

If $K_{n-1}$ is not within the ratio coefficient range (e.g., 2.5-3.5) and $K_{n-1}>K_{n-2}$, $\Delta\gamma_n=-(\Delta\gamma_{n-1}+\text{a preset value})$ may be calculated to perform the current n-th iteration.

The preset value may be a value less than $\Delta\gamma_1$, for example, the preset value may be half of $\Delta\gamma_1$. The preset value may be preset according to actual requirements. In some embodiments, a size and a direction of the iterative step size $\Delta\gamma_n$ of the current iteration may be determined based on a distance between the ratio coefficient $K_{n-1}$ of the previous iteration and the ratio coefficient range (e.g., 2.5-3.5). Specifically, at the beginning of the iteration, a starting point may explore forward with the preset iterative step size $\Delta\gamma_1$. If the distance increases during the exploration, the direction of the step size may be changed. If the distance decreases during the exploration, the original exploration direction may be maintained and the iterative step size may be doubled.

In some embodiments of the present disclosure, a small iterative step size may lead to problems such as excessive iterations. A large iterative step size may cause the iterations to fail to converge, affecting the accuracy of iteration results. Determining the iterative step size by the step size determination algorithm may effectively solve the above problems, reduce the time spent on iteration, and make the iteration results more accurate.

In 220, the actual overflow coefficient may be updated based on the iterative step size.

In 230, the actual width of the overflow surface may be updated based on an updated coefficient.

The updated coefficient refers to a coefficient obtained by updating the actual overflow coefficient based on the iterative step size.

In some embodiments, the judgment output module 180 may be configured to update the actual overflow coefficient based on an updated coefficient of the n−1th iteration round of iteration and the iterative step $\Delta\gamma_n$ of the n-th iteration to obtain the updated coefficient. If the actual overflow coefficient used for the first iteration is $\gamma_1$ and the iterative step size is $\Delta\gamma_1$, the updated coefficient for the first iteration is $\gamma_1+\Delta\gamma_1$. Then, the updated coefficient of the n-th iteration is $\gamma_{n-1}+\Delta\gamma_n$, wherein γn−1 denotes the updated coefficient of the n−1th iteration.

In some embodiments, the judgment output module 180 may be configured to update the actual width of the overflow surface by updating the updated coefficient by the processes of FIG. 1 (e.g., by substituting into the equation (6-2)), or the like, and calculate to obtain an updated width. The updated width refers to an updated actual width of the overflow surface. More descriptions of the equation (6-2) may be found in FIG. 6 and the related descriptions.

In 240, the updated thickness of the side plate may be determined based on the updated coefficient and the updated width.

The updated thickness of the side plate refers to an updated average thickness of the side plate.

In some embodiments, the judgment output module 180 may be configured to obtain the updated thickness of the side plate by calculating the updated coefficient and the updated width by the processes of FIG. 1 (e.g., by substituting into the equation (6-5)), or the like. More descriptions of the equation (6-5) may be found in FIG. 6 and the related descriptions.

In 250, in response to determining that a magnitude relationship between the updated thickness of the side plate and the thickness of the glass substrate satisfies the preset corresponding relationship, the iteration may be stopped, and the updated coefficient and the updated width corresponding to the updated coefficient may be output.

In some embodiments, the judgment output module 180 may be configured to stop the iteration when a ratio of the side plate thickness to the updated thickness of the glass substrate satisfies the ratio coefficient range (e.g., 2.5-3.5) as described above. For example, the iteration may be ended if $K_n$ is within the ratio coefficient range (e.g., 2.5-3.5). The judgment output module 180 may be configured to output the updated coefficient (e.g., the updated actual overflow coefficient) and the updated width (e.g., the updated actual width of the overflow surface).

In some embodiments, when the ratio $K_n$ of the average thickness of the side plate to the thickness of the glass substrate does not satisfy the ratio coefficient range, the judgment output module 180 may be configured to continue to repeat the operations 210-250 for the next iteration.

In some embodiments of the present disclosure, iteratively adjusting the actual overflow coefficient allows the ratio coefficient to be within a permissible range (e.g., 2.5-3.5), which can ensure that the produced glass substrate meets the product specification.

Figure 3:
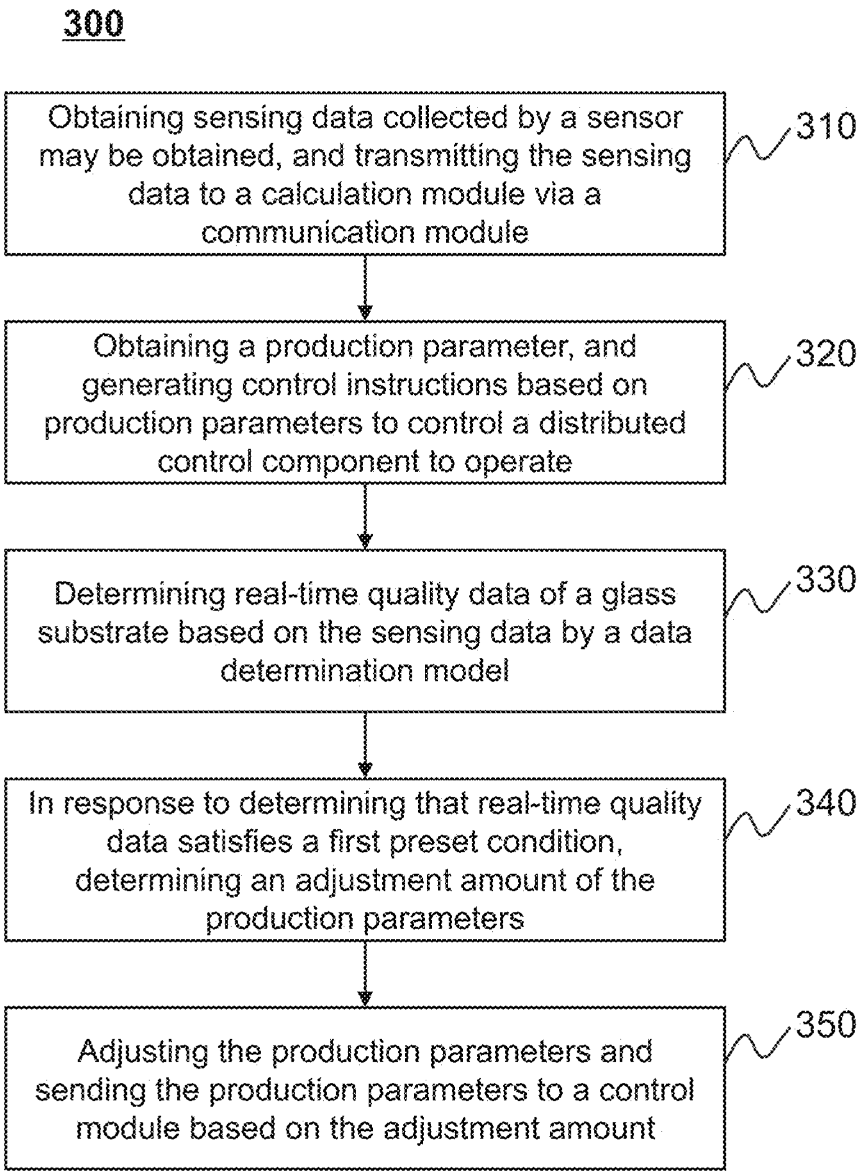
FIG. 3 is a flowchart illustrating an exemplary process for adjusting a production parameter according to some embodiments of the present disclosure.

FIG. 3 is a flowchart illustrating an exemplary process for adjusting a production parameter according to some embodiments of the present disclosure.

In some embodiments, the data acquisition module 110 may further include one or more sensors. The one or more sensors may be detection devices for obtaining data related to the glass substrate, or the like. In some embodiments, the one or more sensors may include an image sensor. The image sensor may be configured to obtain image data of the glass substrate.

In some embodiments, the system 100 may further include a control module and a calculation module.

In some embodiments, the control module may include one or more distributed control components. The one or more distributed control components may be configured to control a production process of an overflow brick when the system performs the production. For example, the one or more distributed control components may include components configured as components for controlling a lead-out amount, components for controlling a temperature of a glass liquid, components for controlling the start, pause, and termination of the production, or the like, respectively.

In some embodiments, the control module may be configured to perform the operations 310-320.

In some embodiments, the calculation module may be configured to perform operations 330-350.

In 310, sensing data collected by the sensor may be obtained, and the sensing data may be transmitted to the calculation module via a communication module. More descriptions of the communication module may be found in FIG. 1 and related descriptions.

The sensing data refers to data related to the glass substrate. In some embodiments, the control module may be configured to obtain the sensing data based on the sensor. In some embodiments, the sensing data may include image data of the glass substrate, or the like. The image data of the glass substrate refers to image data of a finished product on the glass substrate. The control module may be configured to obtain the image data of the glass substrate based on the image sensor.

In 320, a production parameter may be obtained, and control instructions may be generated based on production parameters to control the distributed control component to operate.

The production parameters refer to parameters related to an actual production process of the glass substrate. For example, the production parameters may include a plurality of parameters such as the lead-out amount of the overflow brick, the temperature of the glass liquid, or the like. The overflow brick lead-out amount refers to a liquid flow rate at an inlet of the overflow brick during the actual production process. The temperature of the glass liquid refers to a temperature corresponding to the glass liquid in the actual production process. The calculation module may be configured to obtain the lead-out amount of the overflow brick through the side plate flow module 150.

In some embodiments, the control module may be configured to obtain the production parameters from the selection module 130 and/or the calculation module based on the communication module 120.

The control instructions refer to instructions that control the production process of the glass substrate.

In some embodiments, the control module may be configured to look up a preset instruction table to determine the control instructions based on the production parameters. The preset instruction table may store the production parameters of the production process and the control instructions corresponding to the production parameter.

In 330, real-time quality data of the glass substrate may be determined based on the sensing data by a data determination model.

The real-time quality data refers to data that reflects a real-time production quality in the production process of the glass substrate.

The data determination model refers to a model for determining the real-time quality data for a finished glass substrate product. In some embodiments, the data determination model may be a machine learning model, such as a Neural Network (NN), a Convolutional Neural Networks (CNN) model, or any combination thereof. In some embodiments, an input of the data determination model may include the sensing data of the glass substrate, and an output of the data determination model may include the real-time quality data corresponding to the glass substrate. The sensing data input may include the image data of the glass substrate. More descriptions of the sensing data may be found in the related descriptions above.

In some embodiments, the data determination model may be obtained by training a plurality of second training samples and second training labels corresponding to the plurality of second training samples. Each set of the plurality of the second training samples may include sample sensing data of sample glass substrate. The sample sensing data may include image data of the sample glass substrate. The second training samples may be obtained from historical data. A second training label corresponding to a second training sample refers to sample real-time quality data corresponding to each set of training samples. The second training label corresponding to the second training sample may be obtained by manual labeling or automatic labeling. In some embodiments, the calculation module may be configured to use actual sample real-time quality data corresponding to each set of training samples for subsequent actual inspection of the products as the second training label.

In some embodiments, the calculation module may be configured to input a plurality of second training samples with second training labels into an initial data determination model, construct a loss function from the second training labels and results of the initial data determination model, and update parameters of the initial data determination model based on the loss function by gradient descent or other manner to iteratively update the parameters of the initial data determination model. The model training may be completed when satisfying an iteration condition, and a trained data determination model may be obtained. The iteration condition may include the loss function converges, a count of iterations reaches a threshold, etc.

The data determination model may be configured to determine the real-time quality data from the image data of the glass substrate, so that characteristics of the finished glass substrate product may be identified through the image, and the real-time quality data may be determined through the characteristics of the finished glass substrate product. The characteristics of the finished glass substrate product may include whether there are bubbles in the finished product, the average thickness of the finished product, the width of the side plate, or the like.

In 340, in response to determining that the real-time quality data satisfies a first preset condition, an adjustment amount of the production parameter may be determined.

The first preset condition refers to a preset condition for judging the quality of the finished glass substrate product. For example, the first preset condition may include a qualification rate of the finished glass substrate product being lower than a preset threshold during the production process. The qualification rate may be determined by a percentage of a count of glass substrates that include defects (e.g., bubbles, impurities). The preset threshold may be artificially preset based on experience.

The adjustment amount refers to a value for adjusting the production parameters (to be larger or smaller). If the count of production parameters is multiple, the adjustment amount may be expressed as a sequence. Different elements in the sequence represent the adjustment amount of different production parameters, respectively. More descriptions of the production parameters may be found in FIG. 3 above and related descriptions.

In some embodiments, the calculation module may be configured to determine the adjustment amount in a plurality of ways. For example, the calculation module may be configured to determine the adjustment amount based on a preset corresponding relationship between the real-time quality data and the adjustment amount. The preset corresponding relationship may be manually preset or obtained by pre-experimentation based on requirements.

In some embodiments, the calculation module may be further configured to generate a candidate adjustment amount; predict, based on the candidate adjustment amount, an adjusted quality corresponding to the candidate adjustment amount through a quality prediction model; determine the adjustment amount based on the adjusted quality.

The candidate adjustment amount refers to a candidate value to be recognized as an adjustment amount. The candidate adjustment amount may include adjustment amounts for one or more production parameters.

In some embodiments, the calculation module may be configured to generate one or more sets of candidate adjustment amounts in a plurality of ways. For example, the calculation module may be configured to designate one or more sets of historical adjustment amounts in a historical production process as the one or more sets of candidate adjustment amounts. As another example, the calculation module may be configured to randomly generate the one or more sets of candidate adjustment amounts.

The adjusted quality refers to quality data of a glass substrate produced after adjusting the production parameter based on the candidate adjustment amount.

The quality prediction model refers to a model that predicts the adjusted quality. In some embodiments, the quality prediction model is a machine learning model, such as one or more of a Deep Neural Networks (DNN) model, a Convolutional Neural Network (CNN) model, etc. An input of the quality prediction model may include the candidate adjustment amount for the glass substrate, and an output of the quality prediction model may include the adjusted quality corresponding to the candidate adjustment amount.

In some embodiments, the quality prediction model may be obtained by training a plurality of third training samples and third training labels corresponding to the third training samples. Each set of the third training samples may include a sample actual adjustment amount of a sample glass substrate. The third training samples may be obtained from historical data. A third training label corresponding to a third training sample may be a sample quality data situation of the glass substrate that was produced the third time after each set of training samples is adjusted the first time based on the sample actual adjustment amount. The third time is after the first time and is a future time of the first time. The third training label corresponding to the third training sample may be obtained by manual labeling or automatic labeling. For example, the calculation module may be configured to adjust the sample quality data based on the sample actual adjustment amount and make the adjusted sample quality data that satisfies the first preset condition labeled as 0 (i.e., unqualified), and the adjusted sample quality data that does not satisfy the first preset condition labeled as 1 (i.e., qualified), thereby obtaining the third training label corresponding to the third training sample.

In some embodiments, the calculation module may be configured to input the plurality of third training samples with the third training labels into an initial quality prediction model and obtain the quality prediction model by a manner similar to the manner used for the training of the data determination model. More descriptions may be found in related descriptions of the data determination model in FIG. 3.

In some embodiments, the calculation module may be configured to determine an adjustment amount of the production parameter of the overflow system based on the adjusted quality corresponding to each set of the candidate adjustment amounts. For example, the calculation module may be configured to select an estimated smallest candidate adjustment amount for qualified quality among a plurality of sets of candidate adjustment amounts as the adjustment amount of the production parameter.

By predicting the adjusted quality through the quality prediction model, a quicker and more accurate judgment can be made for the adjusted quality, which facilitates the subsequent judgment of the adjustment amount. Selecting the smallest candidate adjustment amount for qualified quality as a final adjustment amount can minimize an impact on the stability of production under a premise of meeting the production quality.

In 350, the production parameter may be adjusted and the production parameter may be sent to the control module based on the adjustment amount.

In some embodiments, the calculation module may be configured to adjust the production parameter based on the adjustment amount and send an adjusted production parameter to the control module. One or more distributed control components of the control module may control the side plate controlling system for increasing the lead-out amount of the overflow brick to produce with the adjusted production parameter.

In some embodiments of the present disclosure, adjusting the production parameter (e.g., the lead-out amount of the overflow brick, etc.) by the control module and the calculation module can increase the lead-out amount of the overflow brick while ensure the quality of the finished glass substrate product produced by the overflow brick production system.

In some embodiments, the sensing data may further include environmental monitoring data. The calculation module may be further configured to determine, in response to determining that the real-time quality data satisfies a second preset condition, a corrective overflow coefficient based on the environmental monitoring data, the thickness of the glass substrate, and the average thickness of the side plate. More descriptions of the thickness of the glass substrate and the average thickness of the side plate may be found in FIG. 1 and related descriptions.

The environmental monitoring data refers to monitoring data of a production environment of the glass substrate. For example, the environmental monitoring data may include data obtained by monitoring airflow and thermal fields on the glass substrate. The calculation module may be configured to obtain the environmental monitoring data via the data acquisition module. The data acquisition module may be configured to obtain the environmental monitoring data based on an environmental sensor such as a temperature sensor, a gas flow sensor, or the like.

The second preset condition refers to a condition that the glass substrate satisfies a condition for returning to the factory for repair. For example, the second preset condition may include a qualification rate being less than a minimum threshold. The minimum threshold may be set manually on requirements. More descriptions of the qualification rate may be found in FIG. 3 and related descriptions.

The corrective overflow coefficient refers to an overflow coefficient for correcting the glass substrate.

In some embodiments, the calculation module may be configured to construct a first feature vector based on the environmental monitoring data, the thickness of the glass substrate, and the average thickness of the side plate, and look up, based on the first feature vector, a historical overflow coefficient corresponding to a first reference vector with a minimum vector distance as a corrective overflow coefficient in a first vector database. The first vector database may include a plurality of first reference vectors and corresponding historical overflow coefficients. The first reference vector may be constructed based on historical environmental monitoring data, historical thickness of the glass substrate, and historical average thickness of the side plate during the historical production process. In some embodiments, the calculation module may be configured to determine the corrective overflow coefficient in other feasible ways.

In some embodiments, the calculation module may be configured to predict a thickness of a corrective substrate based on the environmental monitoring data and the thickness of the glass substrate and determine the corrective overflow coefficient based on the thickness of the corrective substrate and the average thickness of the side plate.

The thickness of the corrective substrate refers to an adjusted thickness of the glass substrate.

In some embodiments, the calculation module may be configured to predict a thickness of the corrective substrate based on the environmental monitoring data and the thickness of the glass substrate in a plurality of ways.

For example, the calculation module may be configured to predict the thickness of the corrective substrate based on the environmental monitoring data and the thickness of the glass substrate by a glass substrate prediction model. The glass substrate prediction model may be a machine learning model, such as a Deep Neural Network (DNN) model, a Neural Network (NN) model, or any combination thereof.

The glass substrate prediction model may be obtained by training a plurality of fourth training samples and fourth training labels corresponding to the fourth training samples. Each set of fourth training samples may include sample environmental monitoring data, and sample thickness of the glass substrate. The fourth training samples may be obtained from historical data. A fourth training label corresponding to a fourth training sample refers to an actual thickness of the glass substrate measured for the fourth time. The fourth time is after the fourth time and is a future time of the fourth time. In some embodiments, the calculation module may be configured to input a plurality of fourth training samples with the fourth training labels into an initial glass substrate prediction model and train the glass substrate prediction model similarly to the manner of training the data determination model to obtain the glass substrate prediction model. More descriptions may be found in related descriptions of the data determination model in FIG. 3.

As another example, the calculation module may determine the thickness of the corrective substrate based on vector matching. The calculation module may be configured to construct a second feature vector based on the environmental monitoring data, the thickness of the glass substrate, calculate a similarity between the second feature vector and a standard vector, and select a reference corrective substrate corresponding to a standard vector with a highest similarity as the thickness of the corrective substrate. The calculation module may be configured to perform a clustering process based on the historical environmental monitoring data, the historical thickness of the glass substrate, and the corresponding historical thickness of the corrective substrate in the historical database, and designate historical environmental monitoring data, and the historical thickness of the glass substrate corresponding to one or more cluster centers formed by the clustering process as one or more standard vectors, respectively. The calculation module may be configured to designate the historical thickness of the corrective substrate corresponding to the standard vector as a reference thickness of the corrective substrate.

In some embodiments, the calculation module may be configured to determine the corrective overflow coefficient in a plurality of ways. For example, the calculation module may be configured to redetermine the actual overflow coefficient based on the thickness if the corrective substrate and the average thickness of the side plate in the processes described in FIG. 1 and designate a redetermined actual overflow coefficient as the corrective overflow coefficient. As another example, the calculation module may be configured to determine the corrective overflow coefficient based on the thickness of the corrective substrate and the average thickness of the side plate through a corrective coefficient determination model. The corrective coefficient determination model may be a machine learning model, such as a Deep Neural Network (DNN) model, a Neural Network (NN) model, or any combination thereof.

The corrective coefficient determination model may be obtained by training a plurality of fifth training samples and fifth training labels corresponding to the fifth training samples. Each set of fifth training samples may include a sample thickness of the corrective substrate and a sample average thickness of the side plate of a sample substrate. The fifth training samples may be obtained from historical data. The fifth training label corresponding to the fifth training sample refers to a corresponding actual overflow coefficient measured for a sixth time. The sixth time is after the fifth time and is a future time of the fifth time. In some embodiments, the calculation module may be configured to input the plurality of fifth training samples with the fifth labels into an initial corrective coefficient determination model and obtain the corrective coefficient determination model by training in a manner similar to the manner of training the data determination model. More descriptions may be found in related descriptions of the data determination model in FIG. 3.

In some embodiments of the present disclosure determine, based on the environmental monitoring data and the thickness of the glass substrate, the corrective overflow coefficient by predicting the thickness of the corrective substrate, which takes into account the influence of environmental factors on the thickness of the glass substrate and can ensure that the final produced thickness of the glass substrate meets design requirements.

In some embodiments, the calculation module may be configured to maintain the glass substrate based on the corrective overflow coefficient. For example, the calculation module may be configured to maintain or return the glass substrate to the factory for adjustment based on the corrective overflow coefficient. As another example, the calculation module may be configured to produce a new glass substrate based on the corrective overflow coefficient. Subsequent production may be performed based on the adjusted glass substrate or the new glass substrate.

In some embodiments of the present disclosure, due to the thin thickness of the glass substrate, any fluctuation in the production process (including airflow, thermal fields, etc.) may have an impact on the molded thickness of the glass substrate and interfere with the overflow coefficient. Adjusting the glass substrate based on environmental monitoring data may reduce the impact of environmental factors on production to ensure production stability, thereby improving the quality of the product. At the same time, in the case that the produced glass substrate has a low quality, the glass substrate may be returned to the factory on time for repair, which can reduce the loss and ensure the quality of subsequent production of the glass substrate at the same time.

In some embodiments, the calculation module may be further configured to determine, in response to determining that current sensing data of a current period satisfies an update condition, a temperature correlation through a preset rule based on the current sensing data. The current sensing data refers to sensing data obtained based on a preset period. The preset rule may be determined based on a current actual overflow coefficient and a current actual width of the overflow surface; generate, based on the temperature correlation and a current temperature of the glass liquid, a temperature control instruction, and send the temperature control instruction to the control module. The temperature control instruction may be configured to adjust the temperature of a glass liquid.

In some embodiments, the control module may be configured to obtain the sensing data collected by the sensor based on the preset period. More descriptions of obtaining the sensing data collected by the sensor may be found in FIG. 3 and related descriptions thereof.

The preset period refers to a period for obtaining the sensing data collected by the sensor. The current period refers to a period corresponding to production at the current time. The current sensing data refers to the sensing data collected by the sensor in the current period.

The preset period may be preset in advance in a plurality of ways. In some embodiments, the control module may be configured to determine the preset period based on a defective rate of the products. For example, the control module may count the defective rate of the products and determine a period with the least defective products as the preset period. In some embodiments, the control module may be configured to determine the preset period based on a last temperature adjustment amount and a time interval between the time for the last temperature adjustment and the current time. For example, the preset period may be negatively correlative to the last temperature adjustment amount, and positively correlative to the time interval. For example, the larger the last temperature adjustment amount, the smaller the time interval, and the smaller the preset period. In some embodiments, the control module may be configured to obtain the last temperature adjustment amount and the time interval from the database. The database may store execution information for each instruction. The control module may be configured to periodically determine a size of the preset period.

The update condition refers to a condition that the sensing data needs to meet. For example, the update condition may include defects on the glass substrate being greater than a defect threshold. The defect threshold refers to a maximum value of the defects (e.g., deformation, fracture, uneven thickness, etc.) allowed to exist on the glass substrate. As another example, the update condition may include at least one of a deformation of the glass substrate, a fracture of the finished product on the glass substrate, and an uneven thickness being greater than a corresponding defect threshold. The update condition may be set in advance.

The temperature correlation refers to a correlation between problems of the currently product produced currently and the temperature of the glass liquid. The temperature correlation may be expressed in a plurality of ways. For example, a value of 0 indicates no correlation, a value of 1 indicates a positive correlation, and a value of −1 indicates a negative correlation.

In some embodiments, in response to determining that the current sensing data in the current period satisfies the update condition, the calculation module may be configured to determine the temperature correlation through a preset rule based on the current sensing data. For example, the calculation module may be configured to perform an image recognition process based on the current sensing data (e.g., image data of the glass substrate), identify the deformation of the glass substrate, the fracture of the finished product on the glass substrate, the uneven thickness, and determine the temperature correlation based on the preset rule.

The preset rule refers to a preset rule for determining the temperature correlation. The calculation module may be configured to set the preset rule based on the current actual overflow coefficient and the current actual width of the overflow surface. The current actual overflow coefficient refers to an actual overflow coefficient corresponding to current production. The current actual width of the overflow surface refers to an actual width of the overflow surface corresponding to current production. More descriptions of the actual overflow coefficient and the actual width of the overflow surface may be found in FIG. 1 and the related descriptions. Different current actual overflow coefficients and different current actual widths of the overflow surface have preset corresponding relationships with different preset rules. For example, for a current actual overflow coefficient and a current actual width of the overflow surface, the preset rule may include if one or more problematic locations are located at preset locations on the glass substrate, when a count of existing problems (i.e., existing problems in the one or more problematic locations) is greater than a problem quantity threshold, the existing problems being related to a temperature of the glass liquid (e.g., excessively high, excessively low, etc.). The problem quantity threshold refers to a maximum acceptable count of problems on the glass substrate. The problem quantity threshold may be preset. The existing problems may be related to an excessively high temperature or an excessively low temperature of the glass liquid, which may be preset based on experience.

In some embodiments, if the calculation module identifies that the existing problems are related to an excessively high temperature of the glass liquid and the problematic locations are within a location range specified in the preset rule and/or a count of the existing problems is greater than the problem quantity threshold, the calculation module may determine that the temperature correlation is 1.

In some embodiments, if the calculation module identifies that the existing problems are related to an excessively low temperature of the glass liquid and the problematic locations are within the location range specified in the preset rule and/or the count of the existing problems is greater than the problem quantity threshold, the calculation module may determine that the temperature correlation is −1.

In some embodiments, if there is no problem or the problematic locations are outside the location range specified in the preset rule, and/or the count of the existing problems is less than or equal to the problem quantity threshold, the calculation module may determine that the temperature correlation is 0.

In some embodiments, the computing module may be configured to generate a temperature control instruction based on the temperature correlation and the current temperature of the glass liquid and send the temperature control instruction to the control module. The temperature control instruction may be configured to adjust the temperature of the glass liquid through the distributed control component. The temperature control instruction is an instruction related to the temperature adjustment amount of the glass liquid. The temperature adjustment amount may be expressed by levels. For example, if a temperature correlation is 1, indicating that the temperature of the glass liquid is excessively high, the temperature control instruction may be to lower the temperature of the glass liquid by one level. As another example, if the temperature correlation is −1, indicating that the glass liquid is excessively low, and the temperature control instruction may be to increase the temperature of the temperature of the glass liquid by one level.

In some embodiments of the present disclosure, the production parameter (e.g., the temperature of the glass liquid, etc.) may be dynamically adjusted based on the preset period, which can ensure the quality of finished glass substrate product produced by the overflow brick production system while increasing the lead-out volume of the overflow brick.

Figure 4:
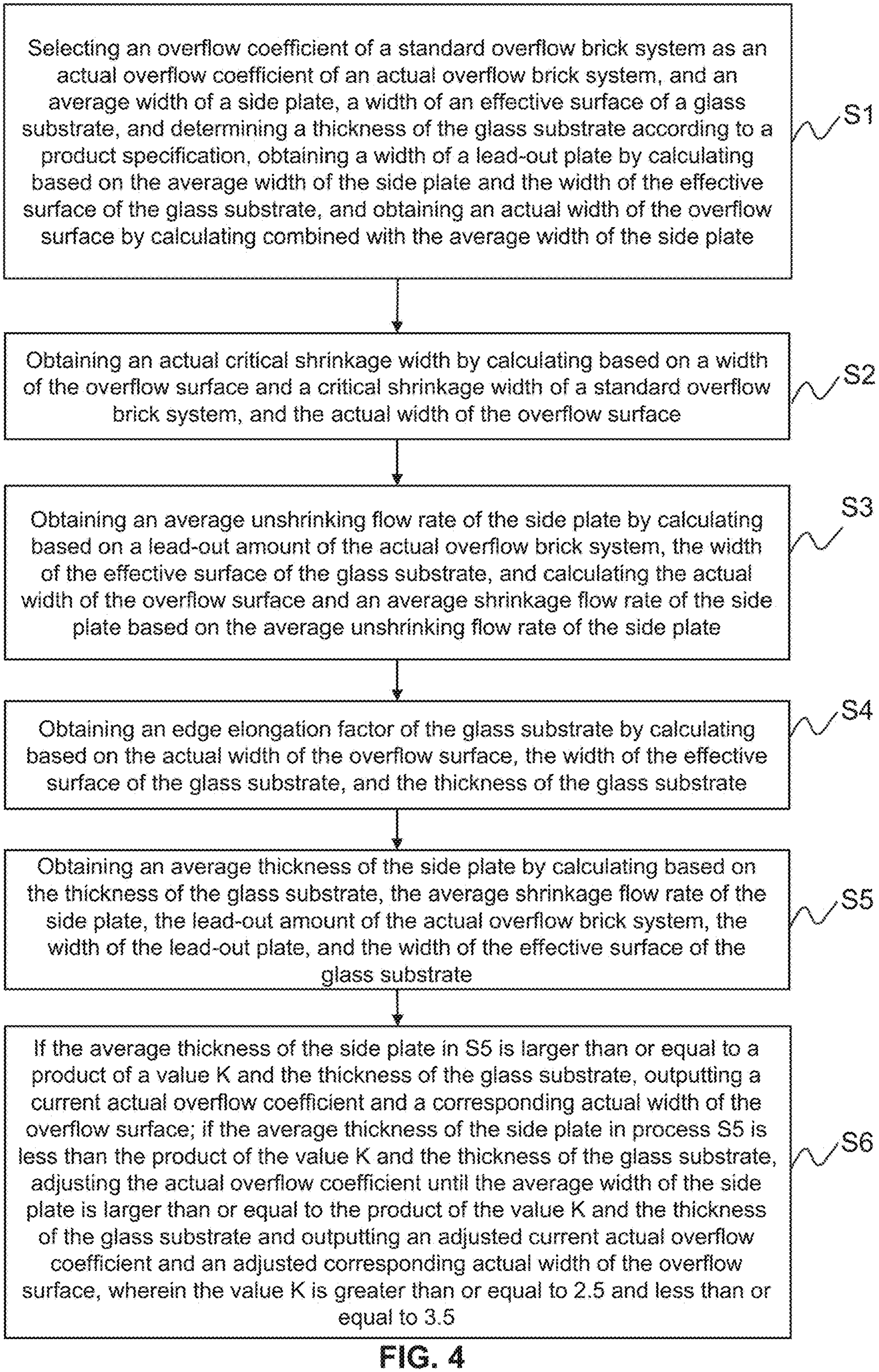
FIG. 4 is a flowchart illustrating an exemplary side plate controlling process for increasing a lead-out amount of an overflow brick according to some embodiments of the present disclosure.

FIG. 4 is a flowchart illustrating an exemplary side plate controlling process for increasing a lead-out amount of an overflow brick according to some embodiments of the present disclosure.

As shown in FIG. 4, in some embodiments, the side plate controlling method for increasing the lead-out amount of the overflow brick may include the following operations.

In S1, an overflow coefficient of a standard overflow brick system may be selected as an actual overflow coefficient of an actual overflow brick system, and an average width of a side plate, a width of an effective surface of a glass substrate, and a thickness of the glass substrate may be determined according to a product specification, a width of a lead-out plate may be obtained by calculating based on the average width of the side plate and the width of the effective surface of the glass substrate, and the actual width of the overflow surface may be obtained by calculating combined with the average width of the side plate.

Figure 6:
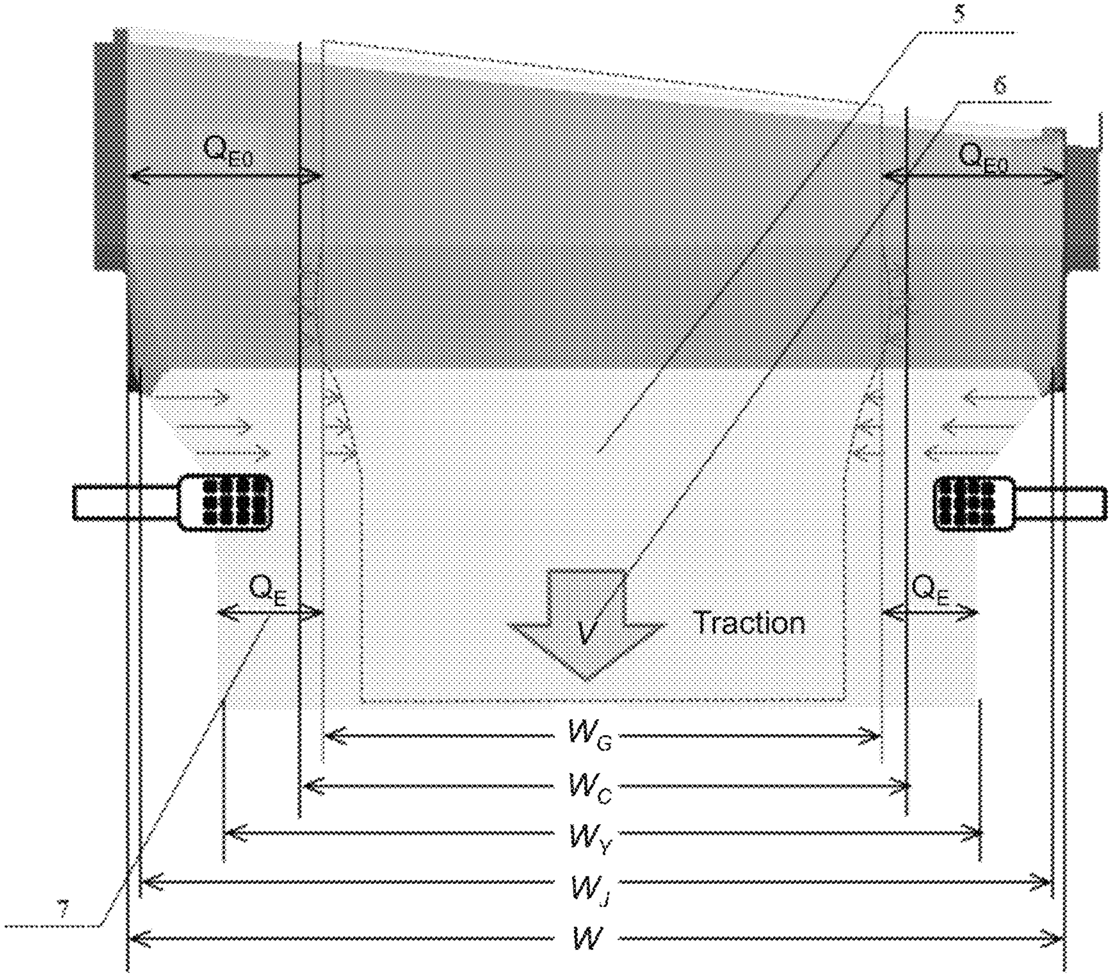
FIG. 6 is a schematic diagram illustrating an overflow pull-down structure according to some embodiments of the present disclosure.

The width of the lead-out plate $W_Y$ may be calculated by an equation (6-1), more descriptions may be found in the related descriptions in FIG. 6.

The actual width of the overflow surface W may be calculated by an equation (6-2), more descriptions may be found in the related descriptions in FIG. 6.

In S2, the actual critical shrinkage width may be obtained by calculating based on the width of the overflow surface and a critical shrinkage width of the standard overflow brick system, and the actual width of the overflow surface.

The actual critical shrinkage width $W_J$ may be calculated by an equation (6-3), more descriptions may be found in the related descriptions in FIG. 6

In S3, an average unshrinking flow rate of the side plate may be obtained by calculating based on a lead-out amount of the actual overflow brick system, the width of the effective surface of the glass substrate, and the actual width of the overflow surface, and an average shrinkage flow rate of the side plate may be calculated based on the average unshrinking flow rate of the side plate.

In S3, the average unshrinking flow rate of the side plate $Q_{E0}$ may be calculated by an equation (6-8), more descriptions may be found in the related descriptions of FIG. 6.

The average shrinkage flow rate of the side plate $Q_E$ may be calculated by an equation (6-9), more descriptions may be found in the related descriptions of FIG. 6.

In S4, an edge elongation factor of the glass substrate may be obtained by calculating based on the actual width of the overflow surface, the width of the effective surface of the glass substrate, and the thickness of the glass substrate.

The edge elongation factor β of the glass substrate may be calculated by equation an (6-4), more descriptions may be found in the related descriptions in FIG. 6.

In S5, the average thickness of the side plate may be obtained by calculating based on the thickness of the glass substrate, the average shrinkage flow rate of the side plate, the lead-out amount of the actual overflow brick system, the width of the lead-out plate, and the width of the effective surface of the glass substrate.

The average thickness of the side plate $T_E$ may be calculated by an equation (6-5), more descriptions may be found in the related descriptions in FIG. 6.

In S6, if the average thickness of the side plate in S5 is larger than or equal to a product of a value K and the thickness of the glass substrate, a current actual overflow coefficient and a corresponding actual width of the overflow surface may be output; if the average thickness of the side plate in process S5 is less than the product of the value K and the thickness of the glass substrate, the actual overflow coefficient may be adjusted until the average width of the side plate is larger than or equal to the product of the value K and the thickness of the glass substrate, and an adjusted current actual overflow coefficient and an adjusted corresponding actual width of the overflow surface may be output, wherein the value K is greater than or equal to 2.5 and less than or equal to 3.5.

In some embodiments, a cut width $W_c$ and a cut height $H_c$ of the glass substrate may be obtained based on the glass substrate width $W_G$ of the effective surface. A speed V of the lead-out plate may be obtained by calculating according to a density p of the glass substrate, the average shrinkage flow rate $Q_E$ of the side plate, the average thickness $T_E$ of the side plate, the width $W_Y$ of the lead-out plate, the width $W_G$ of the effective surface of the glass substrate, and the edge elongation factor f of the glass substrate. The speed V of the lead-out plate may be calculated by an equation (6-11), more descriptions may be found in the related descriptions in FIG. 6.

In some embodiments, an average quality $M_E$ of the side plate may be obtained by calculating based on the lead-out amount Q of the actual overflow brick system, the speed V of the lead-out plate, the cut width $W_c$, the cut height $H_c$, the thickness T of the glass substrate, glass substrate width $W_G$ of the effective surface, the density p of the glass substrate, the average thickness $T_E$ of the side plate, and the edge elongation factor β of the glass substrate. The average quality $M_E$ of the side plate may be calculated by an equation (6-6), more descriptions may be found in the related descriptions in FIG. 6.

In some embodiments, an effective utilization rate λ may be obtained by calculating based on an effective utilization rate λ based on the lead-out amount Q of the actual overflow brick system and the average shrinkage flow rate $Q_E$ of the side plate. The effective utilization rate λ may be calculated by an equation (6-7), more descriptions may be found in the related descriptions in FIG. 6.

To ensure the side plate control more stable and the lead-out plate more stable, the side plate controlling method for increasing the lead-out amount of the overflow brick may also include the following operations.

In S7, the actual overflow coefficient may be adjusted continually so that the average thickness of the side plate is greater than or equal to 3 times the thickness of the glass substrate and is less than or equal to 5 times the thickness of the glass substrate.

By adjusting the width of the lead-out plate of the glass substrate and the actual overflow coefficient in the side plate controlling method for increasing the lead-out amount of the overflow brick, the thickness of the side plate may meet the requirements in a molding process of the glass substrate, which solves the problem of fluctuation of the side plate due to the thin thickness of the side plate in the molding process of the glass substrate after the lead-out amount is increased.

In some embodiments of the present disclosure, the side plate controlling method for increasing the lead-out amount of the overflow brick may start from a width $W_G$ of a target glass substrate, combine an actual overflow coefficient γ and an average width $W_E$ of a side plate to calculate a width $W_Y$ of the lead-out plate of the glass substrate and a width W of the actual overflow surface, and calculate an average thickness $T_E$ of the side plate of the glass substrate, so that the final average thickness $T_E$ of the side plate can meet design requirements. Process parameters may also be used to calculate the other parameters of the overflow brick, including an actual critical shrinkage width $W_J$ of the lead-out plate, a speed V of the lead-out plate, an average flow $Q_E$ of the side plate, an average quality of the side plate $M_E$, and an effective utilization rate $\lambda$ of the glass substrate, to meet the process requirements of the glass substrate production line to manufacture stable lead-out plate. The present disclosure can effectively solve the problem of fluctuation of an on-site molding lead-out plate after the lead-out amount is increased to optimize a thickness distribution of the glass substrate manufacturing. It increases the production margin from the design and ensures that the thickness of the side plate of the glass substrate is the same as the side plate thickness and the consistency of the glass substrate.

In some embodiments of the present disclosure, a side plate controlling system for increasing a lead-out amount of an overflow brick is provided, which is used to implement the operations of any one of the above-described side plate controlling method for increasing the lead-out amount of the overflow brick.

The system may include a selection module, which is configured to select an overflow coefficient of a standard overflow brick system as an actual overflow coefficient of the actual overflow brick system, determine an average width of a side plate, a width of an effective surface of the glass substrate, and a thickness of the glass substrate according to a product specification, obtain a width of a lead-out plate by calculating based on the average width of the side plate and the width of the effective surface of the glass substrate by calculating, and then obtain the width of the lead-out plate by combining the average width of the side plate.

The system may also include an actual critical width shrinkage module, which is configured to obtain an actual critical shrinkage width by calculating based on the width of the overflow surface and a critical shrinkage width of the standard overflow brick system and the actual width of the overflow surface.

The system may also include an average shrinkage flow rate of the side plate module, which is configured to obtain an average unshrinking flow rate of the side plate based on the lead-out amount of the actual overflow brick system, the width of the effective surface of the glass substrate, and the actual width of the overflow surface, and obtain the average shrinkage flow rate of the side plate by calculating based on the unshrinking average side plate flow rate.

The system may also include a glass substrate edge elongation factor module, which is configured to obtain an edge elongation factor of the glass substrate by calculating based on the actual width of the overflow surface, the width of the effective surface of the glass substrate, and the thickness of the glass substrate.

The system may also include an average thickness of the side plate module, which is configured to obtain the average thickness of the side plate by calculating based on the thickness of the glass substrate, the average shrinkage flow rate of the side plate, the lead-out amount of the actual overflow brick system, the width of the lead-out plate, and the width of the effective surface of the glass substrate.

The system may further include a judgment output module. The judgment output module is configured to if the average thickness of the side plate in S5 is larger than or equal to the product of the value K and the thickness of the glass substrate, output a current actual overflow coefficient and a corresponding actual width of the overflow surface; if the average thickness of the side plate in S5 is less than the product of the value K and the thickness of the glass substrate, adjust the actual overflow coefficient until the average thickness of the side plate is larger than or equal to the product of the value K and the thickness of the glass substrate, and then output an adjusted current actual overflow coefficient and an adjusted corresponding actual width of the overflow surface, wherein the value K is greater than or equal to 2.5 and less than or equal to 3.5.

The operations of the above-described design manner may be realized by the side plate controlling system for increasing the lead-out amount of the overflow brick, the side plate controlling system and method for increasing the lead-out amount of the overflow brick is used to make the thickness of the side plate in the molding process of the glass substrate meet the requirements, which solves the problem of fluctuation of the side plate due to the thin thickness of the side plate in the molding process of the glass substrate after the lead-out amount is increased.

Embodiments

Figure 5:
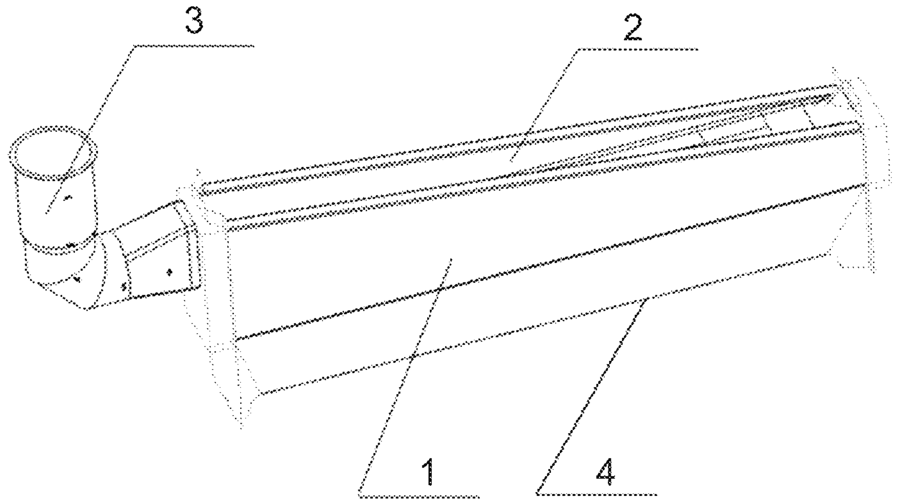
FIG. 5 is a schematic diagram illustrating a structure of a side plate controlling system for increasing a lead-out amount of an overflow brick according to some embodiments of the present disclosure.

FIG. 5 is a schematic diagram illustrating a structure of a side plate controlling system for increasing a lead-out amount of an overflow brick according to some embodiments of the present disclosure.

As shown in FIG. 5, the side plate controlling system for increasing the lead-out amount of the overflow brick is composed of an overflow brick 1 connected with a glass liquid feeding device 3. An overflow tank 2 may be provided in the overflow brick 1, and a bottom of the overflow brick 1 may be a root of the overflow brick 1. When the glass substrate is manufactured in a melt overflow manner, a glass liquid that is melted by a glass melting furnace may be supplied to the glass liquid feeding device 3 in a melt overflow molding device in the molding process. The glass liquid may overflow along the overflow tank 2 through both sides of overflow brick 1, and the glass substrate may be formed below the root 4 of the overflow brick 1.

FIG. 6 is a schematic diagram illustrating an overflow pull-down structure according to some embodiments of the present disclosure.

As shown in FIG. 6, a lead-out plate serves as a molding base for a glass substrate, during a pull-down molding process of a glass substrate, a molded glass substrate 5 may be operated downwardly along a pull-down direction 6 of the glass substrate by a traction force. In the figure, $W_G$ represents a width of the glass substrate, $W_Y$ represents a width of the lead-out plate, W represents a width of an effective surface of the overflow brick, $W_J$ represents a critical shrinkage width (i.e., the actual critical shrinkage width) of the lead-out plate, $W_C$ represents a cut width of the glass substrate, $Q_{E0}$ represents an initial average flow rate of a side plate (i.e., an average unshrinking flow rate of the side plate), $Q_E$ represents an average shrinkage flow rate of the side plate, which is a side plate range. The glass substrate may be gradually formed by the molten glass liquid along the lead-out plate of the glass in the pull-down molding process. In a width direction, from a center of the glass substrate to both ends of the glass substrate, the thickness of the glass substrate in the middle is thin and uniform, and the thickness of the glass substrate formed from the middle to the sides becomes increasingly thick. $W_G$ represents a width of a target glass substrate (i.e., a width of an effective surface of the glass substrate), and a middle part of the uniform thickness may be generally used. The embodiments may obtain a uniformity and consistency of the thickness of the glass substrate within a range of $W_G$ by controlling the thickness of the side plate.

Combined with FIG. 6, the embodiments disclose a side plate controlling method for increasing a lead-out amount of an overflow brick including the following operations.

In operation 1, a standard overflow brick system may be selected as reference, and an overflow coefficient $\gamma$ of a reference overflow brick may be designated as a design reference, i.e., as an actual overflow coefficient of an actual overflow brick system. According to the product specification, the average width of the side plate $W_E$, and the width of the lead-out plate $W_Y$ may be determined. The width of the lead-out plate $W_Y$ may be determined by the following equation (6-1):

$$W_Y = 1.04\times W_G + 2\times W_E \tag{6-1}$$

The overflow coefficient $\gamma$ of the glass substrate may be determined by the following equation (6-2):

$$\gamma = \frac{W_Y}{W} \tag{6-2}$$

$W_Y$ denotes the width of the lead-out plate of the glass substrate, in millimeters; $W_G$ denotes the width of the effective surface of the glass substrate, in millimeters; W denotes the width of the overflow surface of the overflow brick (the actual width of the overflow surface), in millimeters; $W_E$ denotes the average width of the side plate, in millimeters. Based on the above equation, the width W of the overflow surface of the overflow brick may be determined.

In operation 2, the critical shrinkage width of the lead-out plate $W_J$ may be calculated by the following equation (6-3):

$$W_J = \frac{W}{W_0}\times W_{J0} = W_Y + W\times\frac{W_Y - W_G}{W_G}\times\frac{1-k_s}{k_s} \tag{6-3}$$

$W_J$ denotes an intrinsic parameter of the overflow brick system related to a surface tension of the glass and a wetting and broadening effect of the lead-out plate (the lead-out plate is one of the important components of the overflow brick system).

$$k_s = \frac{Q_E}{Q_{Eo}}$$

represents a flow shrinkage ratio of the side plate, and after the structure of the overflow brick is determined, a coordinated change of $k_s$ and $W_Y$ (i.e., a change of a height of an edge puller, the edge puller is one of the important components of the molding system) not lead to the change of $W_J$; $W_0$ and $W_{J0}$ denote the width of the overflow surface and the critical shrinkage width of the reference overflow brick, respectively; $Q_{E0}$ denotes the average unshrinking flow rate of the side plate, in Kg/Hr; $Q_E$ denotes the average shrinkage flow rate of the side plate, in Kg/Hr.

In operation 3, an edge elongation factor $\beta$ of the glass substrate may be calculated by the following equation (6-4):

$$\beta = 0.325\times\frac{2008\times W_G}{1500\times W}\times\sqrt{\frac{T}{0.5}} = 0.325\times\frac{2008}{1500}\times\frac{\gamma}{\alpha}\times\sqrt{\frac{T}{0.5}} \tag{6-4}$$

$\alpha$ denotes a lead-out plate coefficient, $$\alpha = \frac{W_Y}{W_G};$$

denotes the thickness of the glass substrate, in millimeters.

In operation 4, the average thickness $T_E$ of the side plate of the glass substrate, the average quality $M_E$ of the side plate, and the effective utilization rate $\lambda$ of the glass substrate may be calculated.

The average thickness of the side plate $T_E$ may be determined by the following equation (6-5):

$$T_E = T\times\frac{W_G}{(W_Y - W_G)\times\beta}\times\frac{2\times Q_E}{Q-2\times Q_E} = T\times\frac{W_G}{(W_J - W_G)\times\beta}\times\frac{2\times Q_{Eo}}{Q-2\times Q_{Eo}} \tag{6-5}$$

The average quality $M_E$ of the side plate may be determined by the following equation (6-6):

$$M_E = \frac{Q\times H_C}{V} - T\times W_G\times H_C\times\rho - T_E\times(W_C - W_G)\times\beta\times H_C\times\rho \tag{6-6}$$

Q denotes the lead-out amount of the glass substrate, in kg/Hr; V denotes the lead-out speed in mm/min; p denotes the density of the glass substrate in kg/m3; $W_C$ and $H_C$ denote the cut width and the cut height of the glass substrate, respectively, in millimeters.

The effective utilization rate $\lambda$ may be determined by the following equation (6-7):

$$\lambda = \frac{Q-2\times Q_E}{Q}\times 100\% \tag{6-7}$$

$Q_E$ denotes the average flow rate of the side plate of the glass substrate, in kg/Hr.

The design is that the actual overflow coefficient $\gamma$ of the actual overflow brick system is equal to the overflow coefficient of the reference overflow brick.

When the calculated average thickness $T_E$ of the side plate is less than K×T, $\gamma$ may be adjusted until $T_E$ is larger than or equal to K×T. At this time, the corresponding actual overflow coefficient $\gamma$ and the actual width W of the overflow surface can effectively control the average thickness of the side plate.

When the calculated average thickness $T_E$ of the side plate is larger than or equal to K×T, $\gamma$ may be a flow shrinkage ratio of the side plate that may control the average thickness of the side plate $T_E$. The overflow coefficient $\gamma$ and the width W of the overflow surface of the overflow brick may be determined by step 1.

The value of K is within a range of 2.5-3.5. It should be noted that the value of K may be determined according to the demand of working conditions before manufacturing production. Thus, the value of K is a fixed value within a range of 2.5-3.5 after the start of production.

In some embodiments, $\gamma$ may be further adjusted so that the average thickness of the side plate is greater than or equal to 3 times the thickness of the glass substrate and is less than or equal to 5 times the thickness of the glass substrate. The greater the average thickness of the side plate $T_E$, the more stable controlling the side plate and the more stable the lead-out plate is.

In operation 1, the width of the lead-out plate of the glass substrate $W_Y$ α×$W_G$, and a represents a value of the lead-out plate coefficient, where α is greater than or equal to 1.05 and less than or equal to 1.25.

In operation 2, $k_s$ represents a value of the flow shrinkage ratio of the side plate, wherein $k_s$ is greater than or equal to 0.5 and less than or equal to 1.

In operation 4, the average flow rate of the side plate $Q_E$, the cut width $W_C$, the cut height $H_C$, and the speed V of the lead-out plate of the glass substrate may be calculated as follows.

The average unshrinking flow rate of the side plate $Q_{E0}$ may be determined by the following equation (6-8):

$$Q_{E0} = \frac{Q}{2} \times \left(1 - \frac{W_G}{W}\right) \tag{6-8}$$

The average unshrinking flow rate of the side plate may be determined by the following equation (6-9):

$$Q_E = \frac{Q}{2} \times \left[1 - \frac{(W_J - W_G) \times (Q - 2 \times Q_{Eo})}{(W_J - W_G) \times Q - (W_J - W_Y) \times 2 \times Q_{Eo}}\right] \tag{6-9}$$

The cut width $W_C$ may be determined by the following equation (6-10):

$$W_C = 1.04 \times W_G \tag{6-10}$$

The speed V of the lead-out plate may be determined by the following equation (6-11):

$$V = \frac{2 \times Q_E}{\rho \times T_E \times (W_Y - W_G) \times \beta} \tag{6-11}$$

The flow shrinkage ratio $k_s$ of the side plate in operation 2 may be determined by the following equation (6-12):

$$k_s = \frac{1}{1 + \frac{W_G \times (W_J - W_Y)}{W \times (W_Y - W_G)}} \tag{6-12}$$

The processes may design the width W of the overflow surface of the overflow brick, the critical shrinkage width $W_J$ of the lead-out plate, the speed V of the lead-out plate, the average thickness $T_E$ of the side plate, the average flow rate $Q_E$ of the side plate, the average quality $M_E$ of the side plate, the effective utilization rate λ of the glass substrate, and the flow rate shrinkage ratio $k_s$ of the side plate by combining the a specification size $W_G$ of the glass substrate, cutting sizes $W_C$ and $H_C$, the average width $W_E$ of the side plate, the design lead-out amount Q, and the overflow coefficient γ in operations 1-4, which can effectively solve the problem of the fluctuation of on-site forming lead-out plate after increasing the lead-out amount, further optimize a forming thickness distribution of the glass substrate manufacturing, thus increasing the production margin from the design to ensure that the thickness of the side plate of the glass substrate is the same as the thickness of the side plate and the consistency of the glass substrate.

Figure 7:
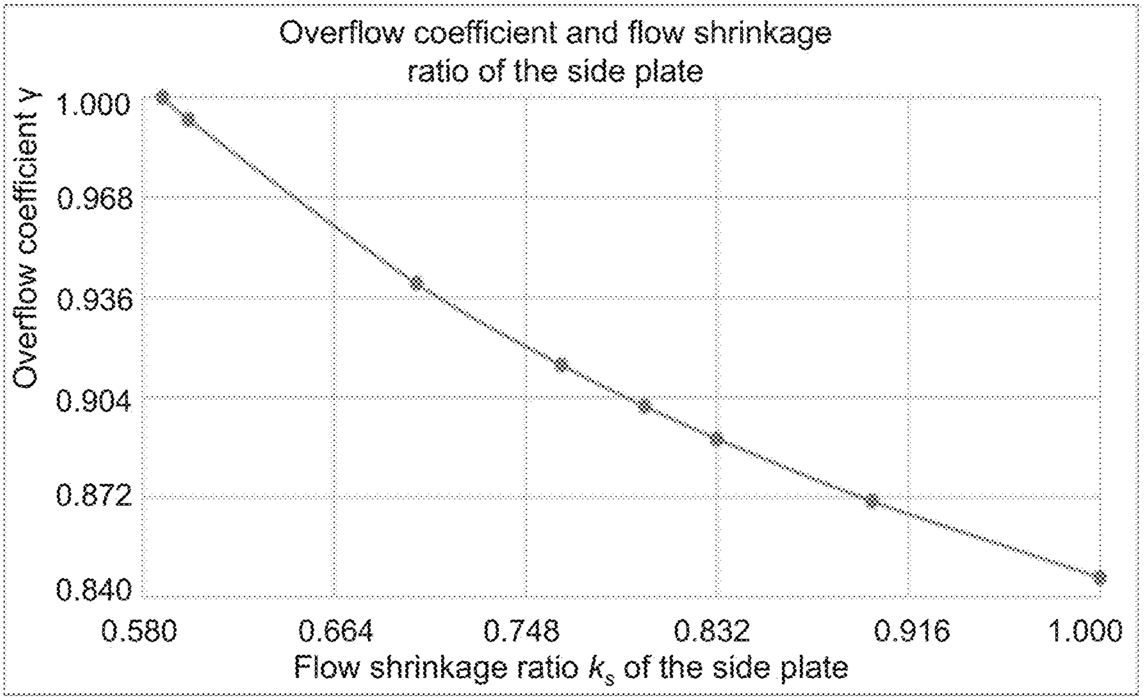
FIG. 7 is a schematic diagram illustrating a relationship between a flow shrinkage ratio of a side plate and an overflow coefficient according to some embodiments of the present disclosure.

FIG. 7 is a schematic diagram illustrating a relationship between a flow shrinkage ratio of a side plate and an overflow coefficient according to some embodiments of the present disclosure.

As shown in FIG. 7, a relationship between the flow shrinkage ratio of the side plate and the overflow coefficient in the embodiment is basically non-linear. According to the equations in step 1, it may be seen that the width $W_Y$ of the lead-out plate is related to the design of the width $W_E$ of the average side plate, and the actual width W of the overflow surface of the overflow brick is related to the design of the overflow coefficient γ.

In this embodiment, the average width $W_E$ of 175 mm of the side plate and the overflow coefficient γ of 0.90960 are selected. A main reason for selecting γ=0.90960 is that a corresponding height of the edge puller is close to the optimum, and the pulling effect is also close to the optimum. Different values of γ may be selected according to the specific situation.

In this embodiment, a width $W_G$ of a target glass substrate is 2,600 mm, the thickness T of the target glass substrate is 0.5 mm, and the target lead-out amount Q is 1,187.5 kg/Hr. The obtained width W of the overflow surface of the overflow brick is 3358 mm, the critical shrinkage width $W_J$ of the lead-out plate is 3272, the speed V of the lead-out plate is 5323 mm/min, the average thickness $T_E$ of the side plate is 1.6751 mm, the average flow rate $Q_E$ of the side plate is 97.74 kg/Hr, the average quality $M_E$ of the side plate is 544.97 g, the effective utilization rate λ of the glass substrate is 83.54%, and the flow shrinkage ratio $k_s$ of the side plate is 0.72928.

Figure 8:
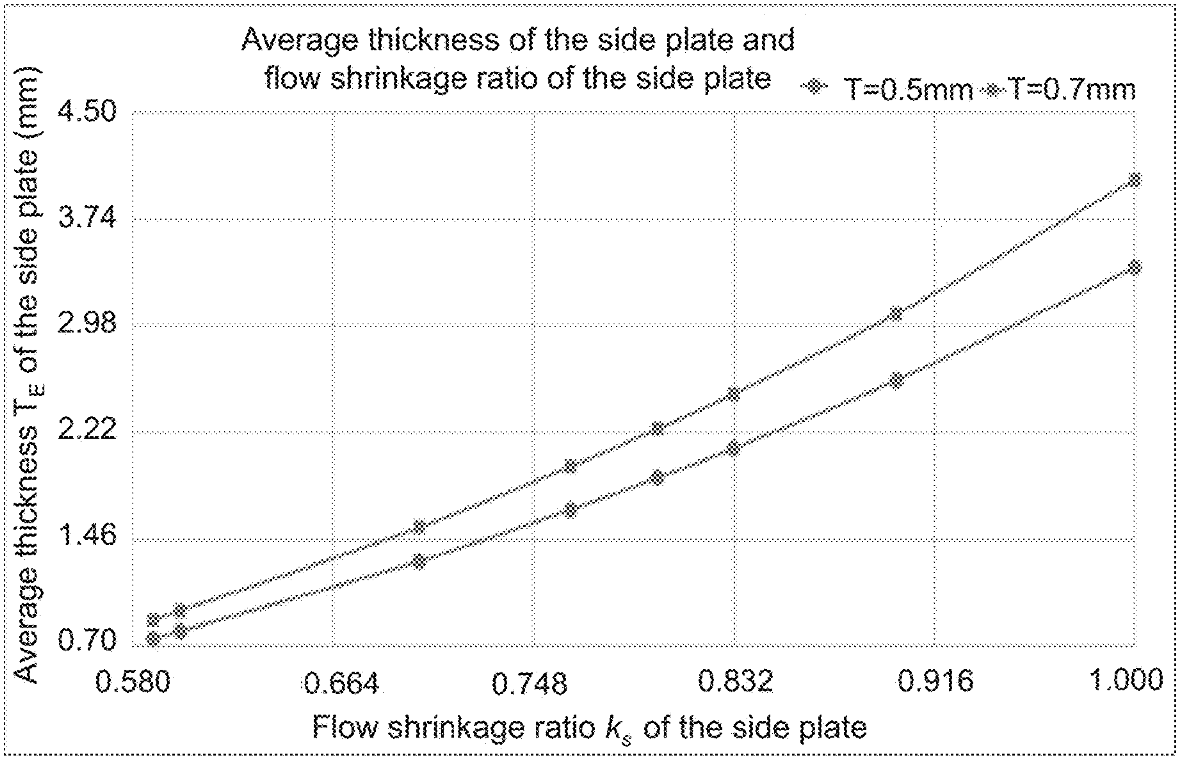
FIG. 8 is a schematic diagram illustrating a relationship between a flow shrinkage ratio of a side plate and an average thickness of a side plate according to some embodiments of the present disclosure.

FIG. 8 is a schematic diagram illustrating a relationship between a flow shrinkage ratio of a side plate and an average thickness of the side plate according to some embodiments of the present disclosure.

FIG. 8 shows another embodiment of the relationship between the flow shrinkage ratio of the side plate and the average thickness of the side plate. It may be seen that the average thickness of the side plate of the glass substrate increases with the increase of the flow shrinkage ratio of the side plate of the overflow brick, and a suitable flow shrinkage ratio of the side plate is selected so that the average thickness of the side plate of the glass substrate meets a condition of $T_E$ being greater than or equal to 1.5 mm, which takes into account the cost of manufacturing.

Figure 9:
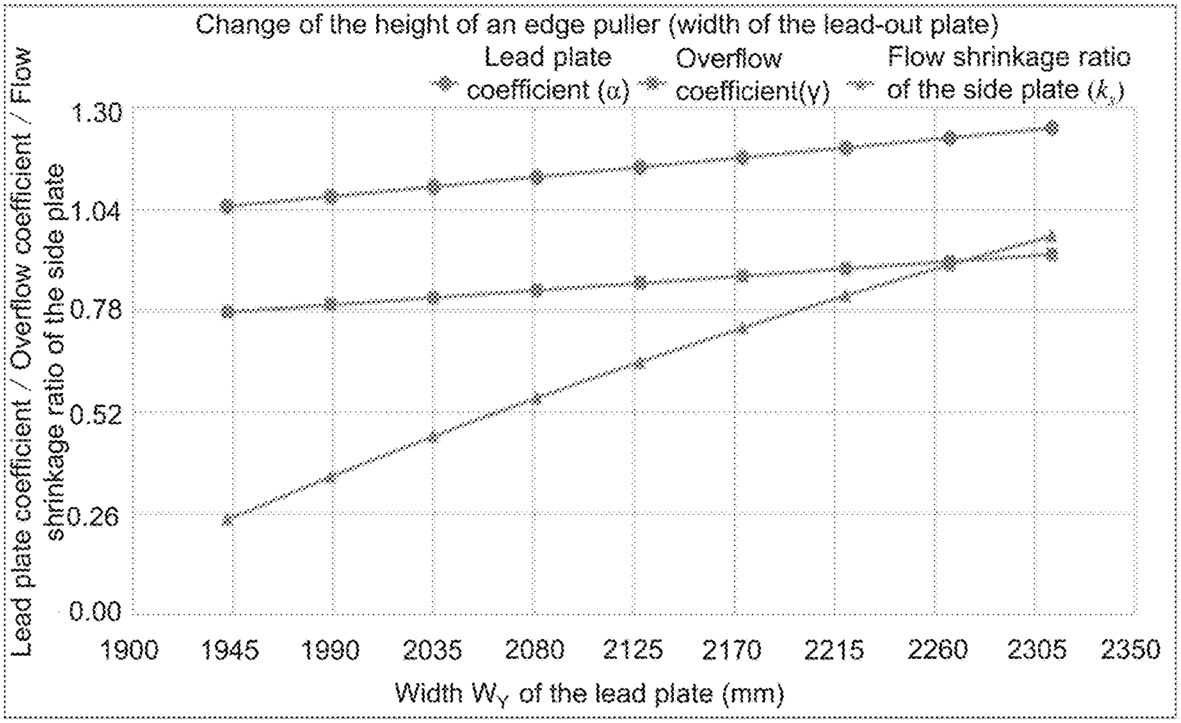
FIG. 9 is a schematic diagram illustrating a relationship between a width of a side plate and a lead-out plate coefficient, an overflow coefficient, and a flow shrinkage ratio of a side plate according to some embodiments of the present disclosure.

FIG. 9 is a schematic diagram illustrating a relationship between a width of a lead-out plate and a lead-out plate coefficient, an overflow coefficient, and a flow shrinkage ratio of a side plate according to some embodiments of the present disclosure.

FIG. 9 shows another embodiment of the relationship between the width of the lead-out plate and the lead-out plate coefficient, the overflow coefficient, and the flow shrinkage flow ratio of the side plate. For a defined and completed design, the width of the lead-out plate, the lead-out plate coefficient, the overflow coefficient, and the flow shrinkage ratio of the side plate may change in actual production when the height of the edge puller is adjusted. When the height of the edge puller is reduced, the width of the lead-out plate may tend to be smaller, and the lead-out plate coefficient, the overflow coefficient, and the flow shrinkage ratio of the side plate may also tend to be smaller. In actual production, the height of the edge puller may be close to an optimal position, at this time, the thickness distribution of the side plate and a transition zone of an effective surface may be optimal, and the lead-out plate may be in a most stable status.

In some embodiments of the present disclosure, the side plate controlling method for increasing the lead-out amount of the overflow brick may start from the width $W_G$ of the target glass substrate, combine the actual overflow coefficient γ and the average width $W_E$ of the side plate to calculate the lead-out width $W_Y$ of the glass substrate and the width W of the effective surface of the overflow brick, and further calculate the average thickness $T_E$ of the side plate of the glass substrate, to make the final average thickness $T_E$ of the side plate meet design requirements. The process parameters may be also used to calculate the other parameters of the overflow brick, including the actual critical shrinkage width $W_J$ of the lead-out plate, the speed V of the lead-out plate, the average flow $Q_E$ of the side plate, the average quality $M_E$ of the side plate, the effective utilization rate λ of the glass substrate, and the flow shrinkage ratio $k_s$ of the side plate to meet the process requirements of the glass substrate production line to manufacture stable lead-out plate. Using the method can make the thickness of the side plate in the molding process of the glass substrate meet the requirements by adjusting the width of the lead-out plate of the glass substrate and the actual overflow coefficient, which can solve the problem of fluctuation of the side plate due to the thin thickness of the side plate in the molding process of the glass substrate after the lead-out amount is increased.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Correspondingly, the embodiments of the present disclosure are not limited to the embodiments expressly presented and described herein.

What is claimed is:

1. A side plate controlling system for increasing a lead-out amount of an overflow brick, the system including a data acquisition module, a communication module, a selection module, a width shrinkage module, a side plate flow module, an edge elongation factor module, a side plate thickness module, a judgment output module, a control module, and a calculation module, the control module including a distributed control component, the distributed control component is configured to control a production process of an overflow brick when the system performs production, wherein the data acquisition module is configured to obtain an overflow coefficient, a product specification, a width of an overflow surface, and a critical shrinkage width of a standard overflow brick system; wherein the data acquisition module further includes a sensor, and the sensor includes an image sensor;

the selection module is configured to determine an actual overflow coefficient and an actual width of the overflow surface of an actual overflow brick system based on the overflow coefficient and the product specification;

the width shrinkage module is configured to determine an actual critical shrinkage width based on the width of the overflow surface, the critical shrinkage width, and the actual width of the overflow surface;

the side plate flow module is configured to determine an average shrinkage flow rate of a side plate based on a lead-out amount of the actual overflow brick system, a width of an effective surface of a glass substrate, and the actual width of the overflow surface;

the edge elongation factor module is configured to determine an edge elongation factor of the glass substrate based on the actual width of the overflow surface, the width of the effective surface, and a thickness of the glass substrate;

the side plate thickness module is configured to determine an average thickness of the side plate based on the thickness of the glass substrate, the average shrinkage flow rate of the side plate, the lead-out amount, a width of a lead-out plate, and the width of the effective surface; and the judgment output module is configured to:

in response to determining that a magnitude relationship between the average thickness of the side plate and the thickness of the glass substrate satisfies a preset corresponding relationship, output the actual overflow coefficient and the actual width of the overflow surface corresponding to the actual overflow coefficient;

in response to determining that the magnitude relationship between the average thickness of the side plate and the thickness of the glass substrate does not satisfy the preset corresponding relationship, adjust the actual overflow coefficient until the magnitude relationship between the average thickness of the side plate and the thickness of the glass substrate satisfies the preset corresponding relationship, output the adjusted actual overflow coefficient and an adjusted actual width of the overflow surface corresponding to the adjusted actual overflow coefficient, wherein the adjusting process includes performing one or more iterations;

the communication module is configured to:

communicate with the data acquisition module, the selection module, the width shrinkage module, the side plate flow module, the edge elongation factor module, the side plate thickness module, the judgment output module, and an overflow brick production system;

in response to obtaining an output result of the judgment output module, send the output result to the overflow brick production system for production control, wherein the output result includes the actual overflow coefficient and the actual width of the overflow surface or the output result includes the adjusted actual overflow coefficient and the adjusted actual width of the overflow surface;

the control module is configured to:

obtain sensing data collected by the sensor and transmit the sensing data to the calculation module via the communication module;

obtain a production parameter:

generate control instructions based on the production parameter to control the distributed control component to operate, including: controlling the side plate controlling system for increasing the lead-out amount of the overflow brick to produce with the adjusted production parameter based on the distributed control component, wherein the distributed control component includes components configured as components for controlling the lead-out amount, components for controlling a temperature of a glass liquid, and components for controlling start, pause, and termination of the production;

the calculation module is configured to:

determine real-time quality data of the glass substrate based on the sensing data by a data determination model, wherein the data determination model is a machine learning model;

in response to determining that the real-time quality data satisfies a first predetermined condition, determine an adjustment amount of the production parameter, the production parameter includes the lead-out amount of the overflow brick;

adjust the production parameter based on the adjustment amount and send the production parameter to the control module.

2. The system of claim 1, wherein the selection module is further configured to:

determine the actual overflow coefficient of the actual overflow brick system based on the overflow coefficient;

determine an average width of the side plate, the width of the effective surface, and the thickness of the glass substrate based on the product specification;

determine the width of the lead-out plate based on the average width of the side plate and the width of the effective surface; and determine the actual width of the overflow surface based on the width of the lead-out plate and the average width of the side plate.

3. The system of claim 1, wherein the side plate flow module is further configured to:

determine an average unshrinking flow rate of a side plate based on the lead-out amount, the width of the effective surface, and the actual width of the overflow surface; and determine the average shrinkage flow rate of the side plate based on the average unshrinking flow rate of the side plate.

4. The system of claim 1, wherein the iteration includes:

determining an iterative step size of the actual overflow coefficient based on an incremental learning process;

updating the actual overflow coefficient based on the iterative step size;

updating the actual width of the overflow surface based on the updated coefficient;

determining an updated thickness of the side plate based on the updated coefficient and an updated width; and in response to determining that the magnitude relationship between the updated thickness of the side plate and the thickness of the glass substrate satisfies the preset corresponding relationship, stopping the iteration and outputting the updated coefficient and the updated width corresponding to the updated coefficient.

5. The system of claim 4, wherein the judgment output module is further configured to:

determine the iterative step size based on the average thickness of the side plate, a ratio coefficient, the thickness of the glass substrate, and a preset iterative step size, by a step size determination algorithm.

6. The system of claim 1, wherein the magnitude relationship between the average thickness of the side plate and the thickness of the glass substrate is expressed by a ratio coefficient between the average thickness of the side plate and the thickness of the glass substrate, the ratio coefficient is greater than or equal to 2.5 and less than or equal to 3.5; and the preset corresponding relationship e is that a ratio between the average thickness of the side plate and the thickness of the glass substrate is greater than or equal to the ratio coefficient.

7. The system of claim 1, wherein the calculation module is further configured to:

generate a candidate adjustment amount;

predict, based on the candidate adjustment amount, an adjusted quality corresponding to the candidate adjustment amount through a quality prediction model, wherein the quality prediction model is a machine learning model; and determine the adjustment amount based on the adjusted quality.

8. The system of claim 1, wherein the sensing data further includes environmental monitoring data, and the calculation module is further configured to:

in response to determining that the real-time quality data satisfies a second predetermined condition, determine a corrective overflow coefficient based on the environmental monitoring data, the thickness of the glass substrate, and the average thickness of the side plate.

9. The system of claim 8, wherein the calculation module is further configured to:

predict a thickness of a corrective substrate based on the environmental monitoring data and the thickness of the glass substrate; and determine the corrective overflow coefficient based on the thickness of the corrective substrate and the average thickness of the side plate.

10. The system of claim 1, wherein the calculation module is further configured to:

in response to determining that current sensing data of a current period satisfies an update condition, determine a temperature correlation through a preset rule based on the current sensing data, wherein the current sensing data is sensing data obtained based on a preset period, and the preset rule is determined based on a current actual overflow coefficient and a current actual width of the overflow surface; and generate, based on the temperature correlation and a current temperature of a glass liquid, a temperature control instruction, and send the temperature control instruction to the control module, wherein the temperature control instruction is configured to adjust a temperature of the glass liquid; wherein the temperature control instruction is configured to: in response to the temperature correlation being 1, lower the temperature of the glass liquid by one level; and in response to the temperature correlation being −1, increase the temperature of the glass liquid by one level;

the control module is configured to control, based on the temperature control instruction, a component for controlling the temperature of the glass liquid among the distributed control components, so as to adjust the temperature of the glass liquid according to a temperature adjustment amount of the glass liquid.

11. The system of claim 1, wherein the width of the lead-out plate is positively correlated to an average width of the side plate and the width of the effective surface; and the actual width of the overflow surface is positively related to the width of the lead-out plate and negatively related to the overflow coefficient.

12. The system of claim 11, wherein the actual critical shrinkage width is positively correlated to the actual width of the overflow surface and the critical shrinkage width and negatively correlated to the width of the overflow surface.

13. The system of claim 12, wherein the average unshrinking flow rate of the side plate is positively correlated to the lead-out amount and the actual width of the overflow surface and negatively correlated to the width of the effective surface; and the side plate flow module is further configured to:

determine the average shrinkage flow rate of the side plate based on the lead-out amount, the actual critical shrinkage width, the width of the effective surface, the average unshrinking flow rate of the side plate, and the width of the lead-out plate.

14. The system of claim 13, wherein the edge elongation factor is positively correlated to the width of the effective surface and the thickness of the glass substrate and negatively correlated to the actual width of the overflow surface.

15. The system of claim 14, wherein the side plate thickness module is further configured to:

determine the average thickness of the side plate based on the thickness of the glass substrate, the width of the effective surface, the width of the lead-out plate, the edge elongation factor, the lead-out amount, and the average shrinkage flow rate of the side plate.

16. The system of claim 15, wherein the system further includes a lead-out plate speed module and a side plate quality module; the lead-out plate speed module is configured to:

determine a cut width and a cut height of the glass substrate based on the width of the effective surface;

determine a lead-out plate speed based on a density of the glass substrate, the average shrinkage flow rate of the side plate, the average thickness of the side plate, the width of the lead-out plate, the width of the effective surface, and the edge elongation factor; and the side plate quality module is configured to:

determine an average quality of the side plate based on the lead-out amount, the lead-out plate speed, the cut width, the cut height, the thickness of the glass substrate, the width of the effective surface, the density of the glass substrate, the average thickness of the side plate, and the edge elongation factor.

17. The system of claim 16, wherein the system further includes a utilization module, and the utilization module is configured to determine an effective utilization rate based on the lead-out amount and the average shrinkage flow rate of the side plate.

18. The system of claim 1, wherein the judgment output module is further configured to:

continue to adjust the actual overflow coefficient such that the ratio coefficient between the average thickness of the side plate and the thickness of the glass substrate is greater than or equal to 3 and less than or equal to 5.

19. The system of claim 1, wherein the sensor includes a temperature sensor, the sensing data further includes environmental monitoring data, the environmental monitoring data includes data obtained by monitoring airflow and thermal fields on the glass substrate; the calculation module is further configured to determine, in response to determining that the real-time quality data satisfies a second preset condition, a corrective overflow coefficient based on the environmental monitoring data, the thickness of the glass substrate, and the average thickness of the side plate.

20. The system of claim 19, wherein the control module is further configured to: look up a preset instruction table to determine the control instructions based on the production parameter, wherein the preset instruction table stores the production parameter of the production process and the control instructions corresponding to the production parameter; and the calculation module is further configured to: maintain or return the glass substrate to the factory for adjustment based on the corrective overflow coefficient, or produce a new glass substrate based on the corrective overflow coefficient.

* * * * *